US011898859B2

(12) United States Patent
Bonanni et al.

(10) Patent No.: US 11,898,859 B2
(45) Date of Patent: Feb. 13, 2024

(54) SYSTEM AND METHOD FOR UPDATING MAP DATA

(71) Applicant: MOTIONAL AD LLC, Boston, MA (US)

(72) Inventors: Taigo Maria Bonanni, Clementi (SG); Gioele Joshua Zardini, Besazio (CH); Francesco Seccamonte, Goleta, CA (US)

(73) Assignee: Motional Ad LLC, Boston, MA (US)

( * ) Notice: Subject to any disclaimer, the term of this patent is extended or adjusted under 35 U.S.C. 154(b) by 0 days.

(21) Appl. No.: 17/129,420

(22) Filed: Dec. 21, 2020

(65) Prior Publication Data

US 2021/0207968 A1 Jul. 8, 2021

Related U.S. Application Data

(60) Provisional application No. 62/957,659, filed on Jan. 6, 2020.

(51) Int. Cl.
*G01C 21/34* (2006.01)
*G01C 21/00* (2006.01)
*B60W 60/00* (2020.01)

(52) U.S. Cl.
CPC ....... *G01C 21/3453* (2013.01); *B60W 60/001* (2020.02); *G01C 21/3815* (2020.08); *G01C 21/3859* (2020.08); *G01C 21/3848* (2020.08)

(58) Field of Classification Search
CPC .......................... G01C 21/3453; G01C 21/32; G01C 21/3859; G01C 21/3815; B60W 60/001
See application file for complete search history.

(56) References Cited

U.S. PATENT DOCUMENTS

2010/0286908 A1* 11/2010 Tate, Jr. ............. G01C 21/3469
701/533
2012/0101654 A1* 4/2012 Samples ................ G08G 1/168
701/1

(Continued)

FOREIGN PATENT DOCUMENTS

CN          108573315 A      9/2018
CN          109447356 A      3/2019
WO     WO 2019/196509 A1   10/2019

OTHER PUBLICATIONS

Lai, C. et al., "Spir: A Secure and Privacy-Preserving Incentive Scheme for Reliable Real-Time Map Updates", IEEE Internet of Things Journal, Jan. 2020, vol. 7(1), pp. 416-428.

(Continued)

*Primary Examiner* — Vivek D Koppikar
*Assistant Examiner* — Godfrey Aleksander Maciorowski
(74) *Attorney, Agent, or Firm* — Knobbe, Martens, Olson & Bear, LLP

(57) ABSTRACT

The present disclosure is directed to a computer system and techniques for updating map data used for navigating an autonomous vehicle. In some embodiments, the computer system is configured to obtain map data including a starting location and a destination location; obtain a plurality of travel times corresponding to a plurality of respective possible routes for traveling from the starting location to the destination location; obtain benefit information for at least a first respective possible route; and determine a selected route based on the travel times and the benefit information. In some embodiments, the computer system is configured to obtain a route between a starting location and a destination location; obtain map-age information for the route; determine a first set of driving parameters for the autonomous vehicle based on the map-age information; and navigate the (Continued)

autonomous vehicle along the route using the first set of driving parameters.

20 Claims, 16 Drawing Sheets

(56) References Cited

U.S. PATENT DOCUMENTS

| | | | |
|---|---|---|---|
| 2012/0158299 A1* | 6/2012 | Cerecke | G01C 21/3469 |
| | | | 701/533 |
| 2015/0142301 A1* | 5/2015 | Dave | H04W 4/40 |
| | | | 701/423 |
| 2016/0061627 A1 | 3/2016 | Tan et al. | |
| 2017/0090478 A1* | 3/2017 | Blayvas | G06Q 10/04 |
| 2017/0248426 A1 | 8/2017 | Jesudason et al. | |
| 2017/0356751 A1* | 12/2017 | Iagnemma | G05D 1/0214 |
| 2018/0245929 A1 | 8/2018 | Watanabe et al. | |
| 2019/0034948 A1 | 1/2019 | Falor et al. | |
| 2019/0101401 A1 | 4/2019 | Balva | |
| 2019/0128687 A1 | 5/2019 | Koichi | |
| 2019/0339709 A1 | 11/2019 | Tay et al. | |
| 2019/0346851 A1 | 11/2019 | Liu et al. | |
| 2020/0018618 A1* | 1/2020 | Ozog | G01S 7/52004 |
| 2020/0065842 A1* | 2/2020 | Viswanathan | G01C 21/3461 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Great Britain Office Action issued for Application No. GB 2100100. 3, dated Aug. 24, 2021.
Great Britain Office Action issued for Application No. GB 2100100. 3, dated May 12, 2022.
Korean Office Action issued for Application No. KR 10-2021-0001396, dated Dec. 28, 2022.
Korean Office Action issued for Application No. KR 10-2021-0001396, dated Sep. 25, 2023.
Chinese Office Action issued for Application No. CN 202110014532.0 dated Nov. 30, 2023.

* cited by examiner

SYSTEM AND METHOD FOR UPDATING MAP DATA

CROSS-REFERENCE TO RELATED APPLICATIONS

This application claims the benefit of U.S. Provisional Patent Application No. 62/957,659, filed Jan. 6, 2020, entitled "SYSTEM AND METHOD FOR UPDATING MAP DATA," the entire contents of which are hereby incorporated by reference.

FIELD

This description relates to a computer system for updating map data used for navigating an autonomous vehicle.

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with map data that provides a map of the roads the autonomous vehicle can navigate. Because road conditions can change over time, maps used to navigate an autonomous vehicle may need to be updated to accurately convey the current configuration and condition of the roads.

SUMMARY

The subject matter described in this specification is directed to a computer system and techniques for updating map data used for navigating an autonomous vehicle. In some embodiments, the disclosed techniques include determining a route of an autonomous vehicle. For example, the computer system is configured to obtain map data including a starting location and a destination location; obtain a plurality of travel times corresponding to a plurality of respective possible routes for traveling from the starting location to the destination location; obtain benefit information for at least a first respective possible route; and determine a selected route based on the travel times and the benefit information. In some embodiments, the disclosed techniques include determining route planning data for a route of an autonomous vehicle. For example, the computer system is configured to obtain a route between a starting location and a destination location; obtain map-age information for the route; determine a first set of driving parameters for the autonomous vehicle based on the map-age information; and navigate the autonomous vehicle along the route using the first set of driving parameters.

These and other aspects, features, and implementations can be expressed as methods, apparatuses, systems, components, program products, means or steps for performing a function, and in other ways.

These and other aspects, features, and implementations will become apparent from the following descriptions, including the claims.

DETAILED DESCRIPTION

Figure 1:
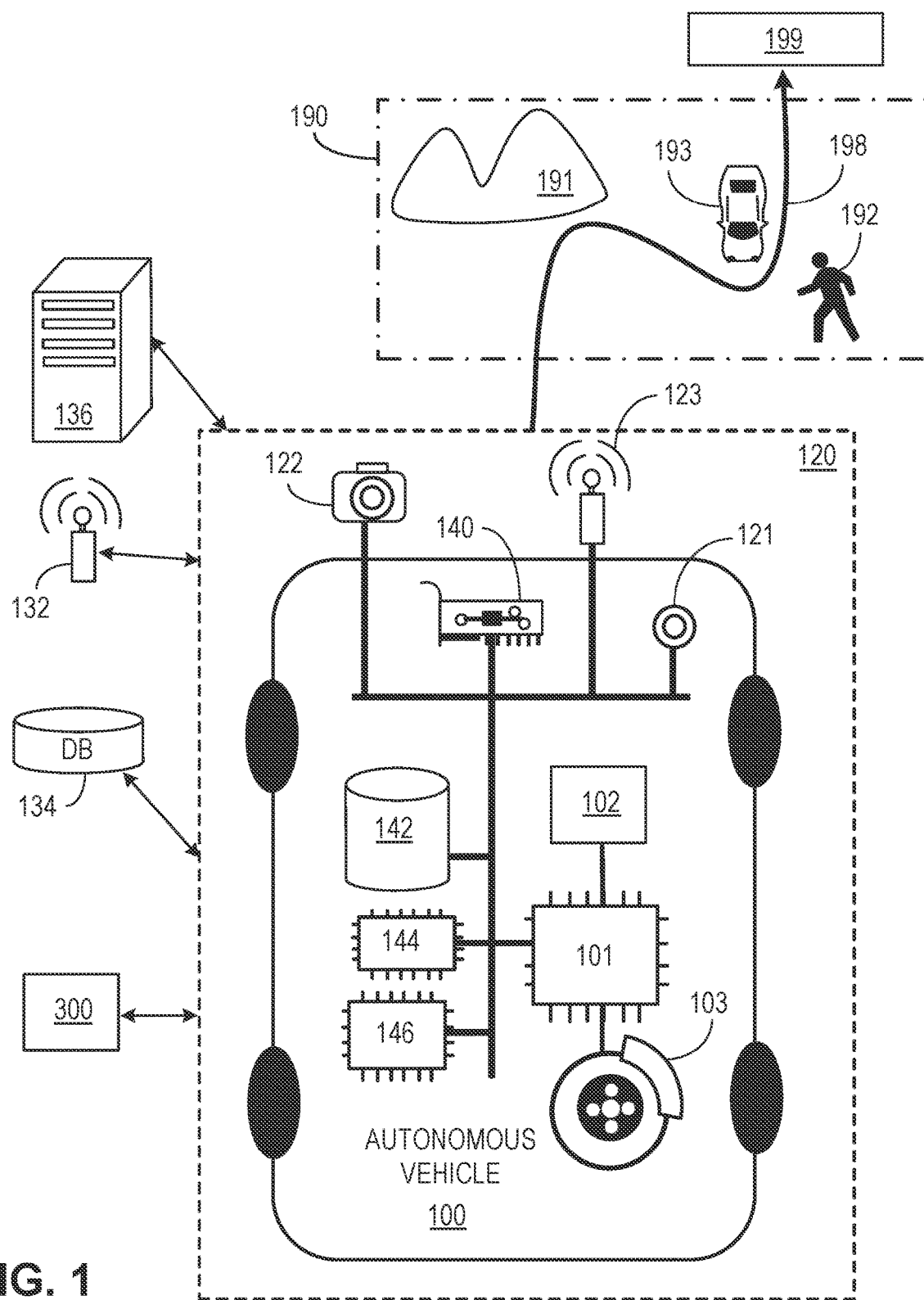
FIG. 1 shows an example of an autonomous vehicle having autonomous capability.

In the following description, for the purposes of explanation, numerous specific details are set forth in order to provide a thorough understanding of the present disclosure. It will be apparent, however, that the disclosed embodiments may be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Map Updating
8. Example Process for Determining a Route
9. Example Process for Determining Route Planning Data for a Route General Overview Autonomous vehicles driving in complex environments (e.g., an urban environment) pose a great technological challenge. In order for autonomous vehicles to navigate these environments, the vehicles use map data to guide the navigation of the vehicle in the environment. The map data can include an indication of roads and objects in the environment. Over time, roads and objects in the environment change, causing the map data to become outdated. Accordingly, the map data should be updated periodically to ensure accurate representation of the environment. One approach for maintaining updated map data involves designating one or more vehicles for the exclusive purpose of driving along specific roads in a geographical region to collect map data for the roads. However, such approaches consume significant resources, including the cost to operate the vehicle in the environment, and the opportunity cost in the potential revenue that is not being generated for a vehicle that is exclusively used for collecting the map data. The present disclosure provides an improved technique for updating the map data in a manner that is compatible with revenue-generating use of the vehicle.

In some embodiments, the system and techniques described herein use a processing circuit to obtain: 1) map data including a starting location and a destination location, 2) a plurality of travel times corresponding to a plurality of respective possible routes for traveling from the starting location to the destination location, and 3) benefit information for at least a first respective possible route. A selected route is then determined based on the travel times and the benefit information. When compared to conventional practices, the disclosed technique permits revenue-generating use of the vehicle while simultaneously collecting map data that can be used for navigating the vehicle.

In some embodiments, the system and techniques described herein use a processing circuit to obtain: 1) a route between a starting location and a destination location, and 2) map-age information for the route. A first set of driving parameters for the autonomous vehicle is then determined based on the map-age information. A control circuit is used to navigate the autonomous vehicle along the route using the first set of driving parameters. When compared to conventional practices, the disclosed technique permits revenue-generating use of the vehicle while simultaneously collecting map data that can be used for navigating the vehicle.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to a second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless specified otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4, and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4, and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Examples of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
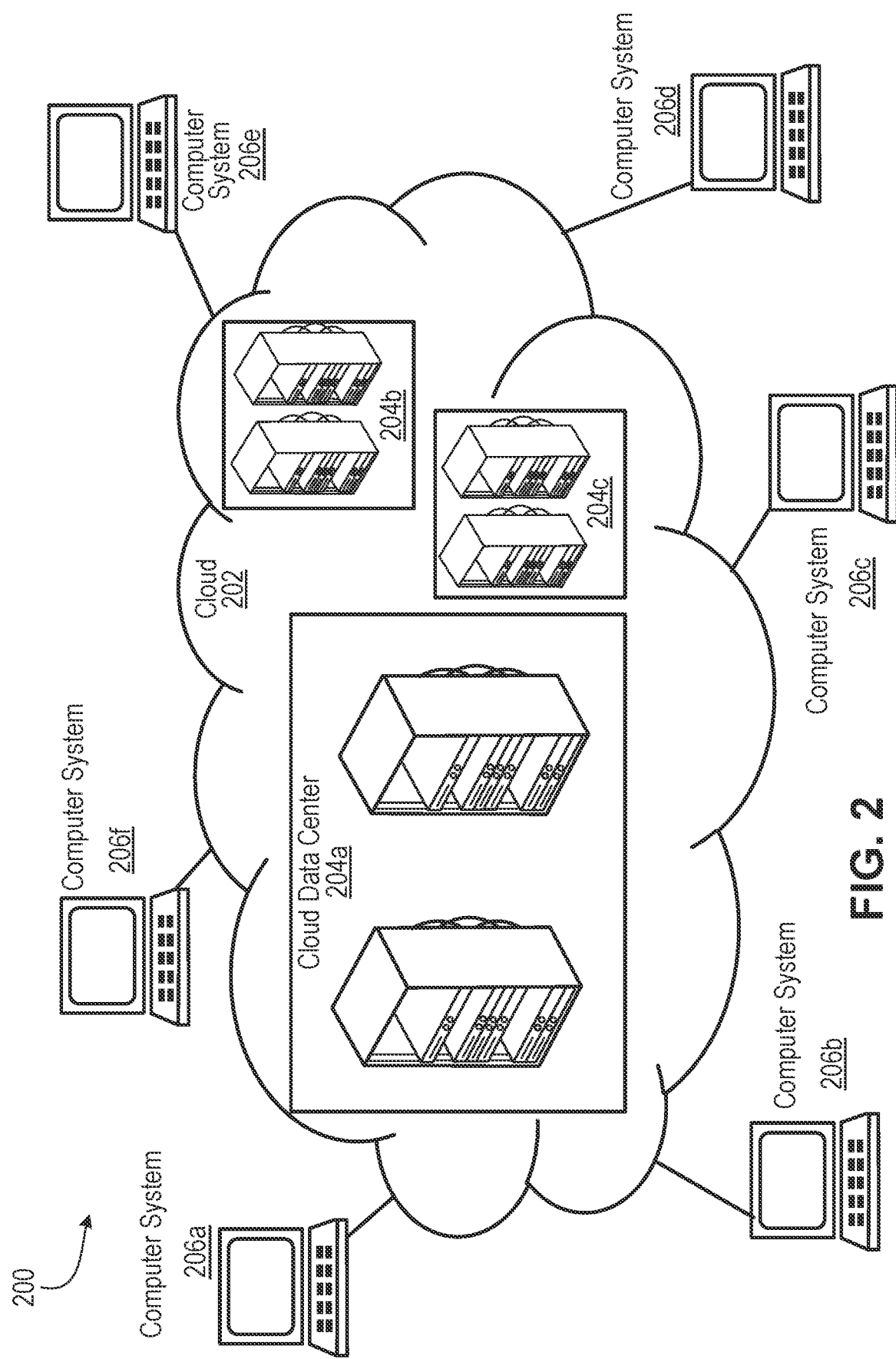
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
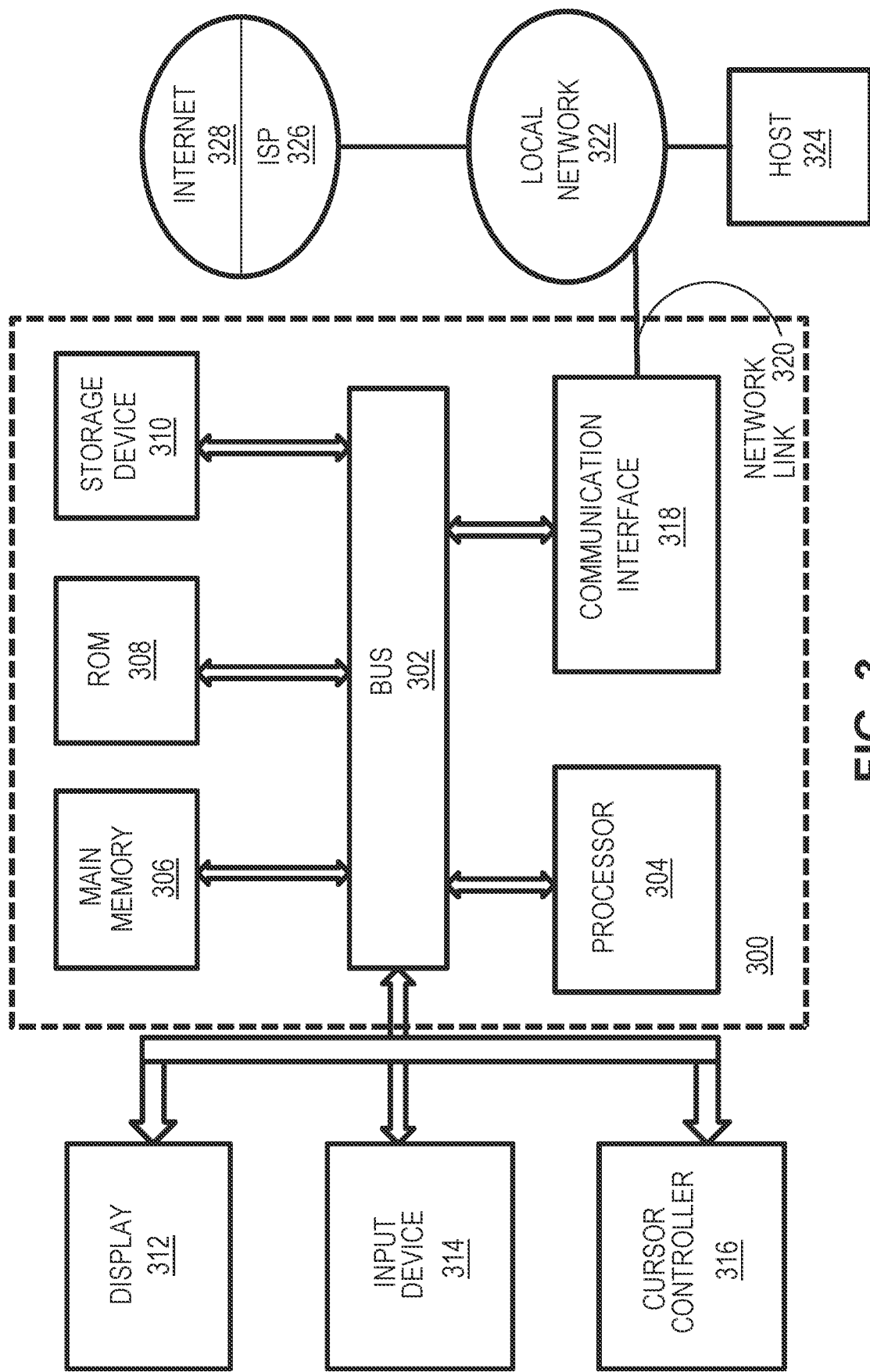
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from, but may be used in conjunction with, transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
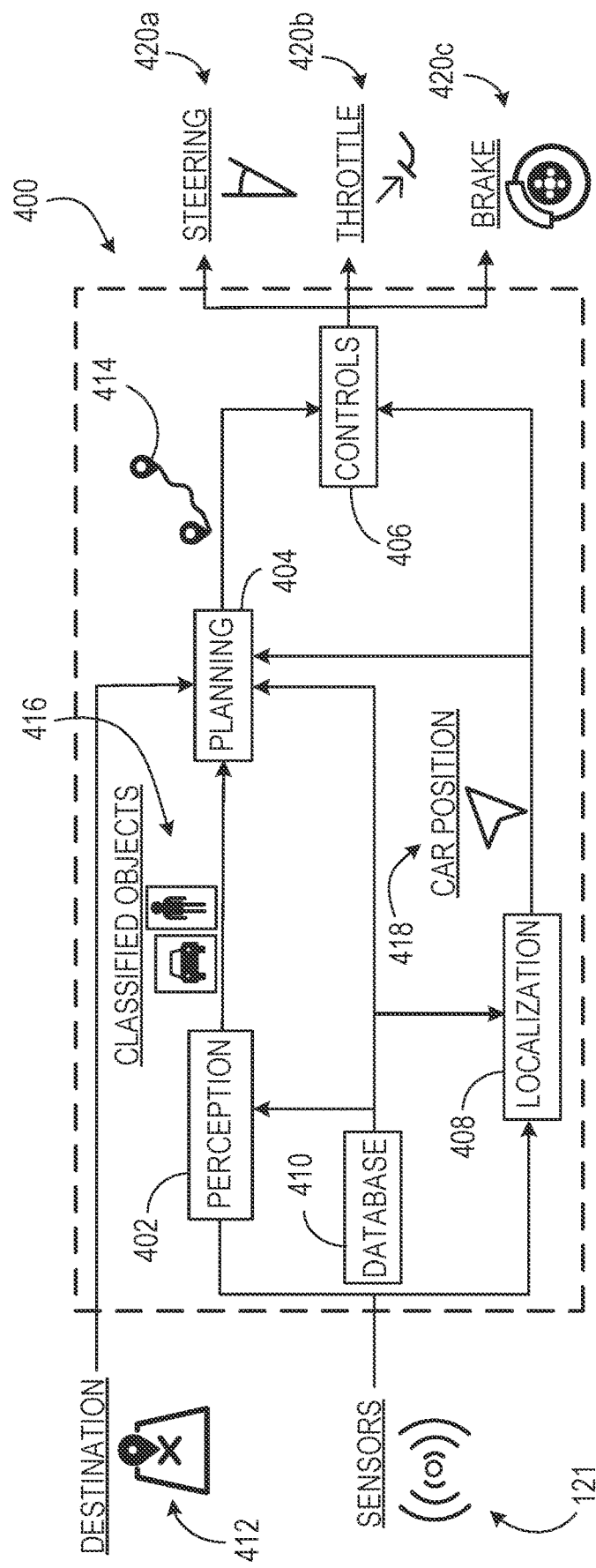
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In some embodiments, this data used by the localization module 408 is referred to generally as map data.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
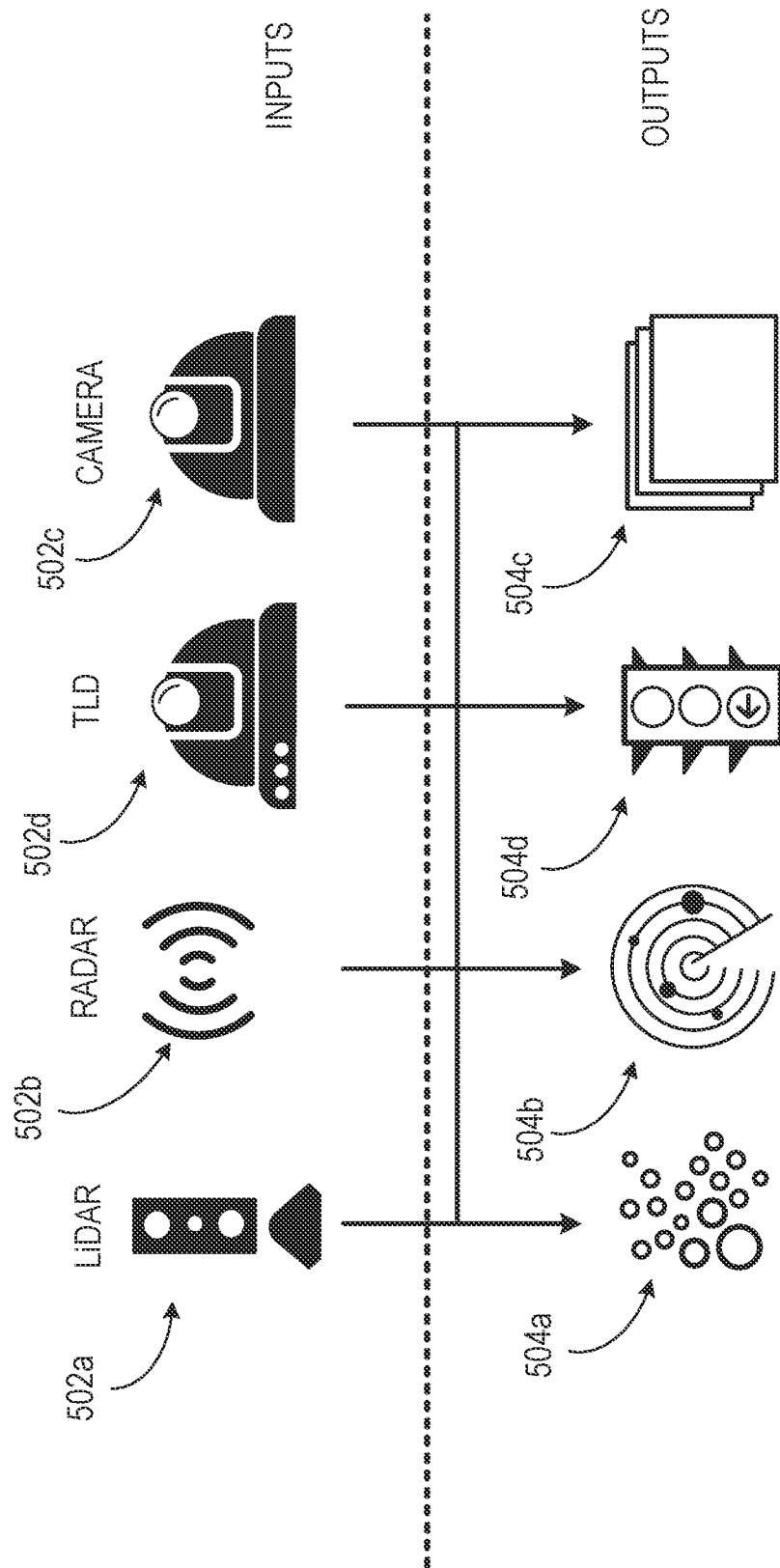
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
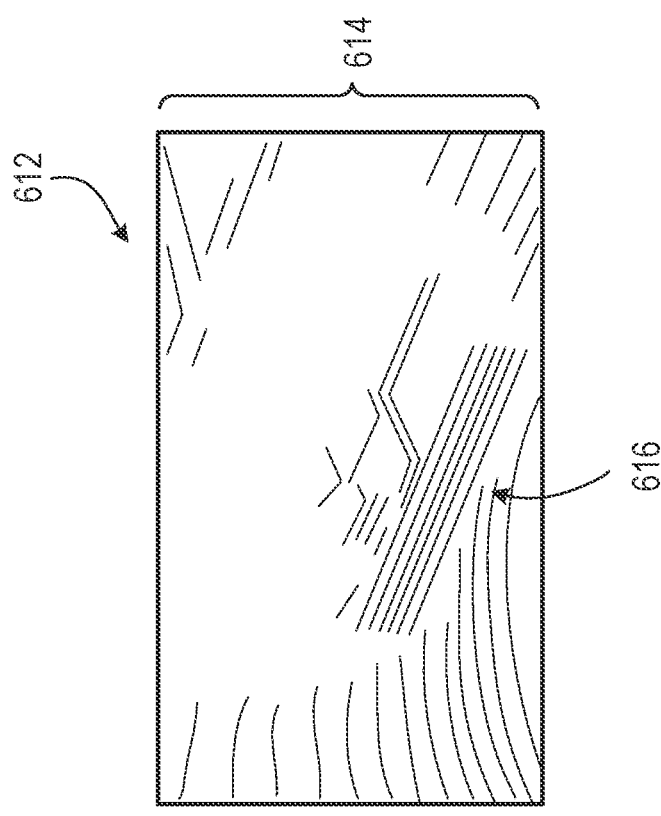
FIG. 6 shows an example of a LiDAR system.
Figure 6:
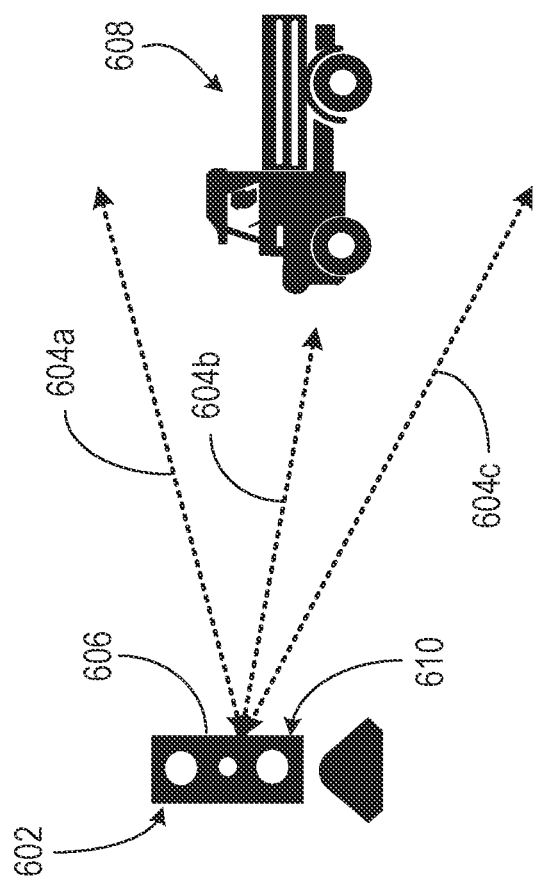

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
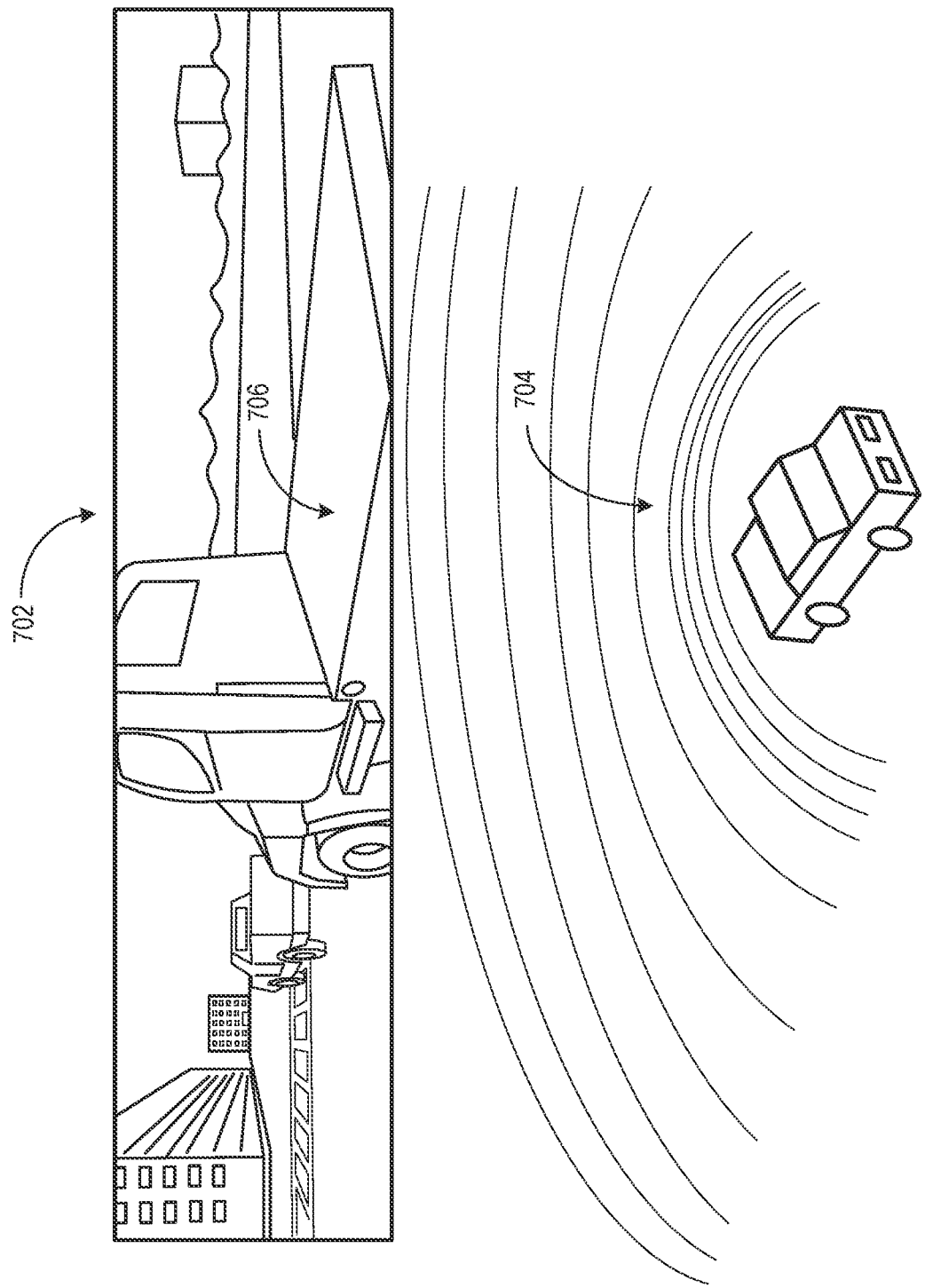
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
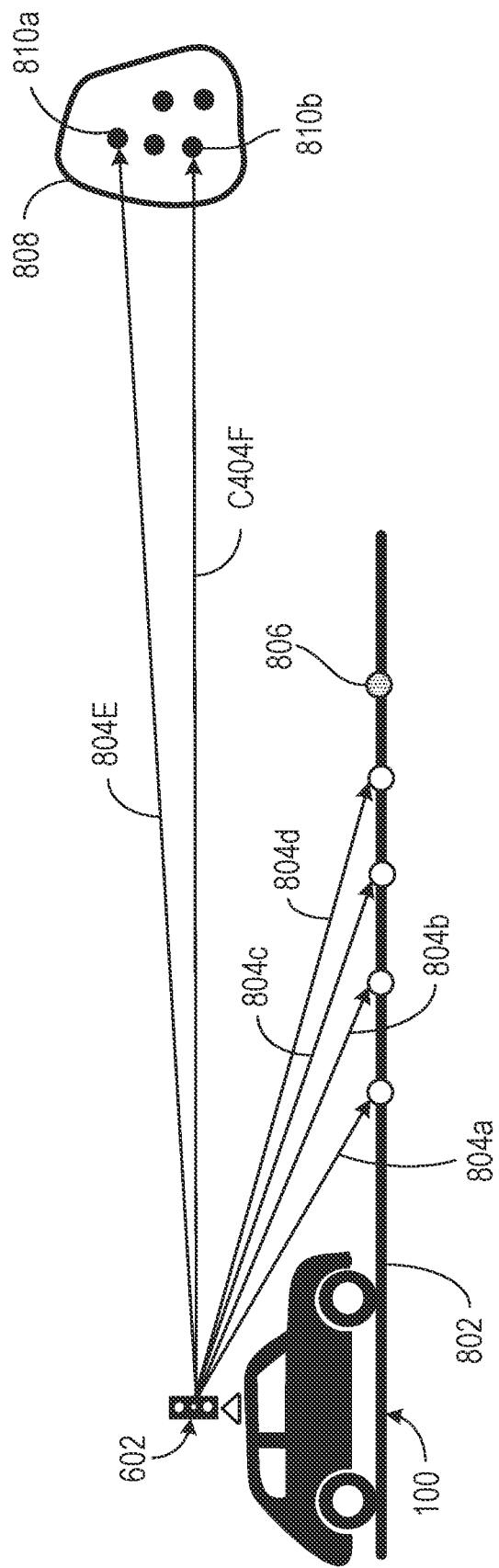
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
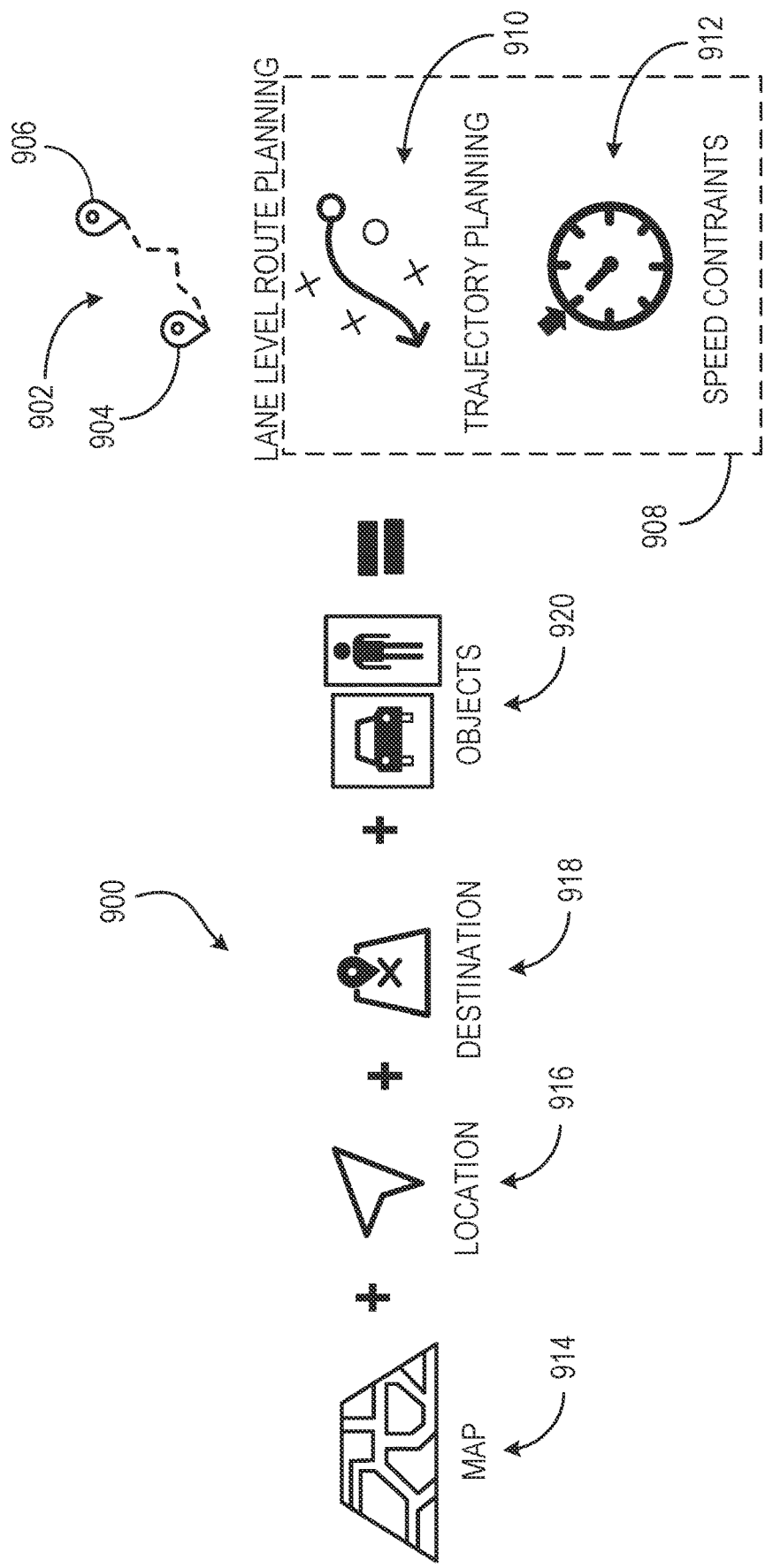
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs route planning data such as, for example, lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or un-expected traffic, the speed constraints 912 may limit the AV 100 to a travel speed slower than an expected speed, e.g., a speed based on speed limit data for the segment. In some embodiments, the route planning data can be used for controlling or dictating various behaviors and maneuvers of AV 100, as discussed in greater detail below.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
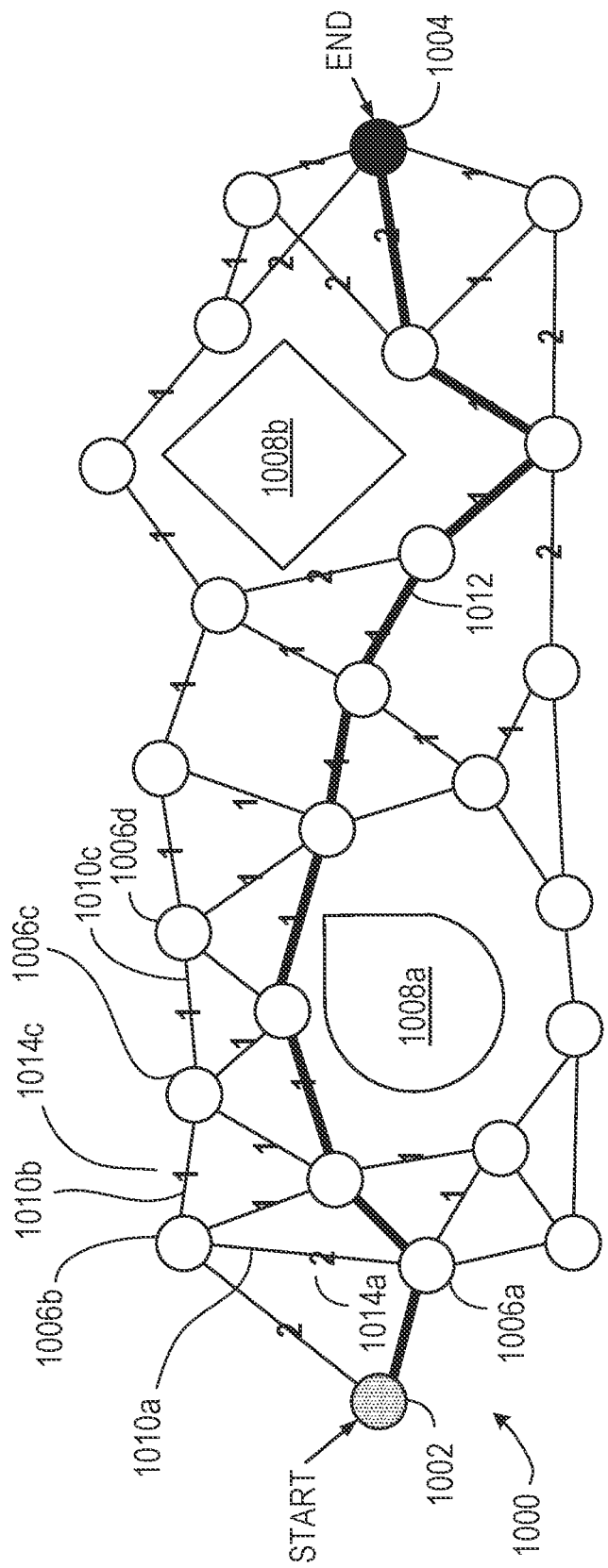
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008*a*-*b* represent physical objects in the field of view of the AV 100, e.g., other automobiles, pedestrians, or other entities with which the AV 100 cannot share physical space. In an embodiment, some or all of the objects 1008*a*-*b* are static objects (e.g., an object that does not change position such as a street lamp or utility pole) or dynamic objects (e.g., an object that is capable of changing position such as a pedestrian or other car).

The nodes 1006*a*-*d* are connected by edges 1010*a*-*c*. If two nodes 1006*a*-*b* are connected by an edge 1010*a*, it is possible for an AV 100 to travel between one node 1006*a* and the other node 1006*b*, e.g., without having to travel to an intermediate node before arriving at the other node 1006*b*. (When we refer to an AV 100 traveling between nodes, we mean that the AV 100 travels between the two physical positions represented by the respective nodes.) The edges 1010*a*-*c* are often bidirectional, in the sense that an AV 100 travels from a first node to a second node, or from the second node to the first node. In an embodiment, edges 1010*a*-*c* are unidirectional, in the sense that an AV 100 can travel from a first node to a second node, however the AV 100 cannot travel from the second node to the first node. Edges 1010*a*-*c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a*-*c* has an associated cost 1014*a*-*b*. The cost 1014*a*-*b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a*-*b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together. However, planning module 404 can choose a different path to achieve another benefit, for example, in order to obtain updated map data as discussed in greater detail below.

Autonomous Vehicle Control

Figure 11:
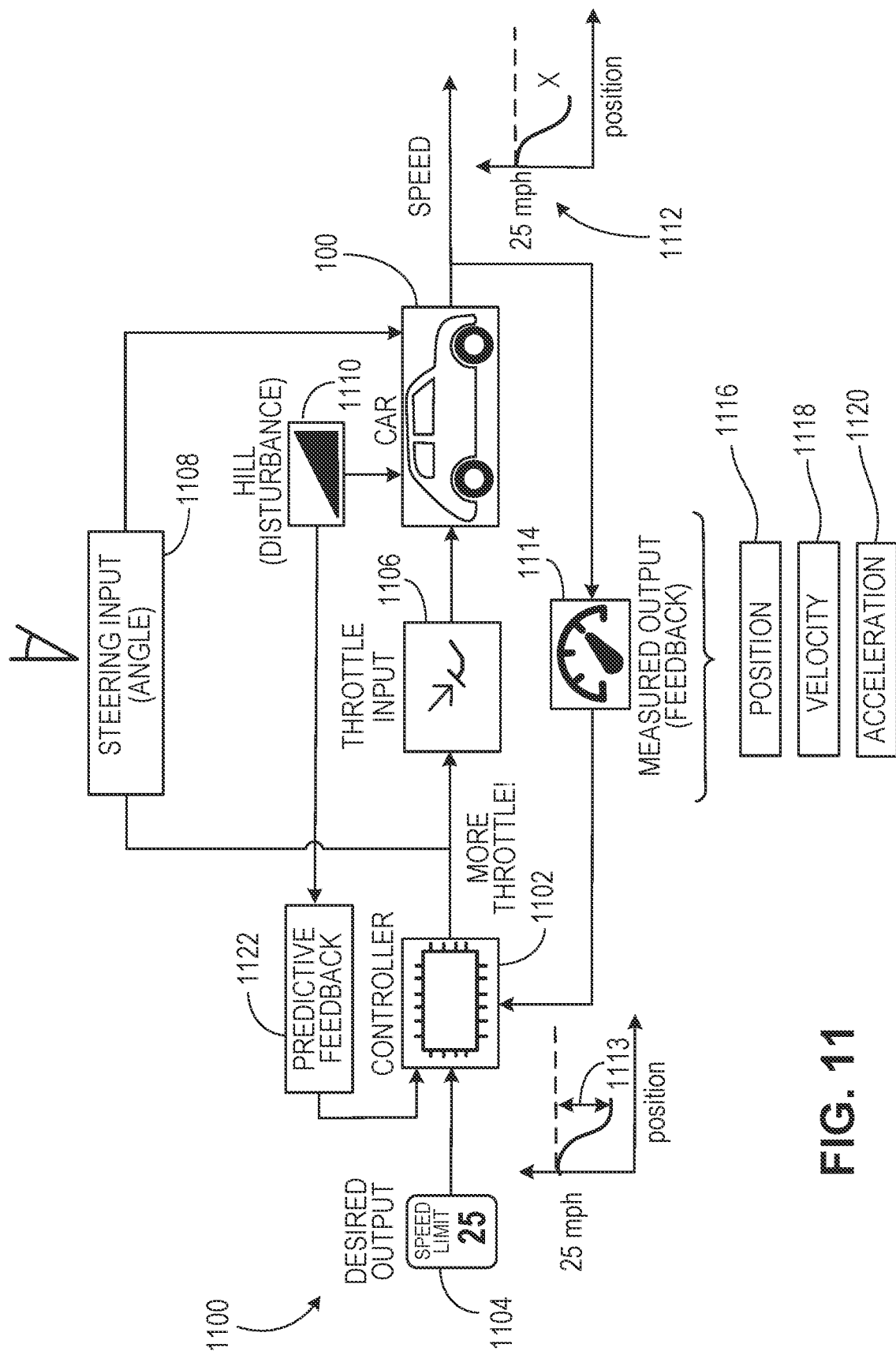
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
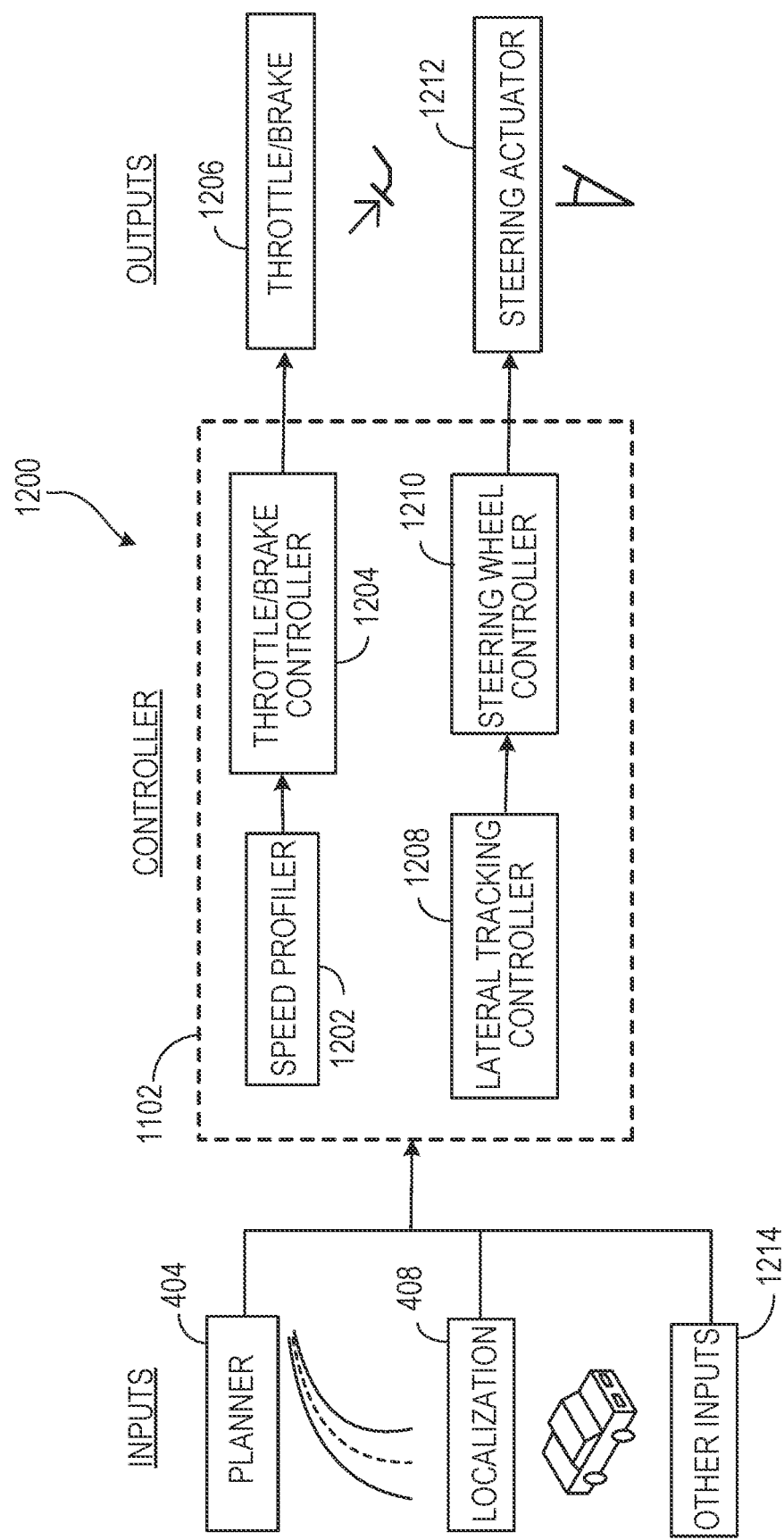
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Map Updating

Optimal navigation controls for an AV (e.g., AV 100) utilize up-to-date map data (also referred to herein as map information). Accordingly, it is beneficial to ensure that the map data used to control navigation of an AV along roads is current and accurate. Some areas of a transportation network require more careful attention to achieve this up-to-date mapping information. These areas may include, for example, routes traveled more frequently and areas subject to renovation work. The present disclosure is directed to a computer system and techniques for updating map data used for navigating an AV. In particular, the disclosed techniques provide an efficient usage of an AV that permits revenue-generating use of the AV while also controlling the AV to obtain updated map data. As such, an operator (e.g., owner) of the AV can continue to utilize the AV to generate revenue (e.g., by operating a rideshare program) while also modifying aspects of the AV's operation to obtain updated map data that can be used to navigate the AV (and other AVs operating using the map data).

In some embodiments, the disclosed techniques involve modifying or determining a particular route for the AV so that the AV can obtain updated map data by collecting environmental information with sensors on the AV while transporting a user of the AV (e.g., a rider such as, for example, a paying rideshare customer) to their destination. In some embodiments, the disclosed techniques involve determining route planning data for a route of an AV (e.g., including modifying a driving behavior of the AV) so that the AV can collect updated map data for one or more sections of the route while also transporting the user of the AV to a specified destination. In some embodiments, the disclosed techniques can be used to achieve other benefits in addition to, or in lieu of, obtaining updated map data. For example, a modification or determination of a particular route, or a particular driving behavior, can be determined in accordance with the present disclosure in order to perform a sensor calibration, generate advertising revenue, and/or to obtain some other benefit to the operator of the AV, as discussed in greater detail below.

In some embodiments, AV system 120 of FIG. 1 (optionally combined with one or more components of computer system 300 and/or architecture 400), appropriately programmed in accordance with this specification, can perform the disclosed techniques for updating map data used for navigating an AV. In some embodiments, the computer system 300 of FIG. 3 (optionally combined with one or more components of AV system 120 and/or architecture 400), appropriately programmed in accordance with this specification, can perform the disclosed techniques. In some embodiments, architecture 400 of FIG. 4 (optionally combined with one or more components of computer system 300 and/or AV system 120), appropriately programmed in accordance with this specification, can perform the disclosed techniques.

Figure 13A:
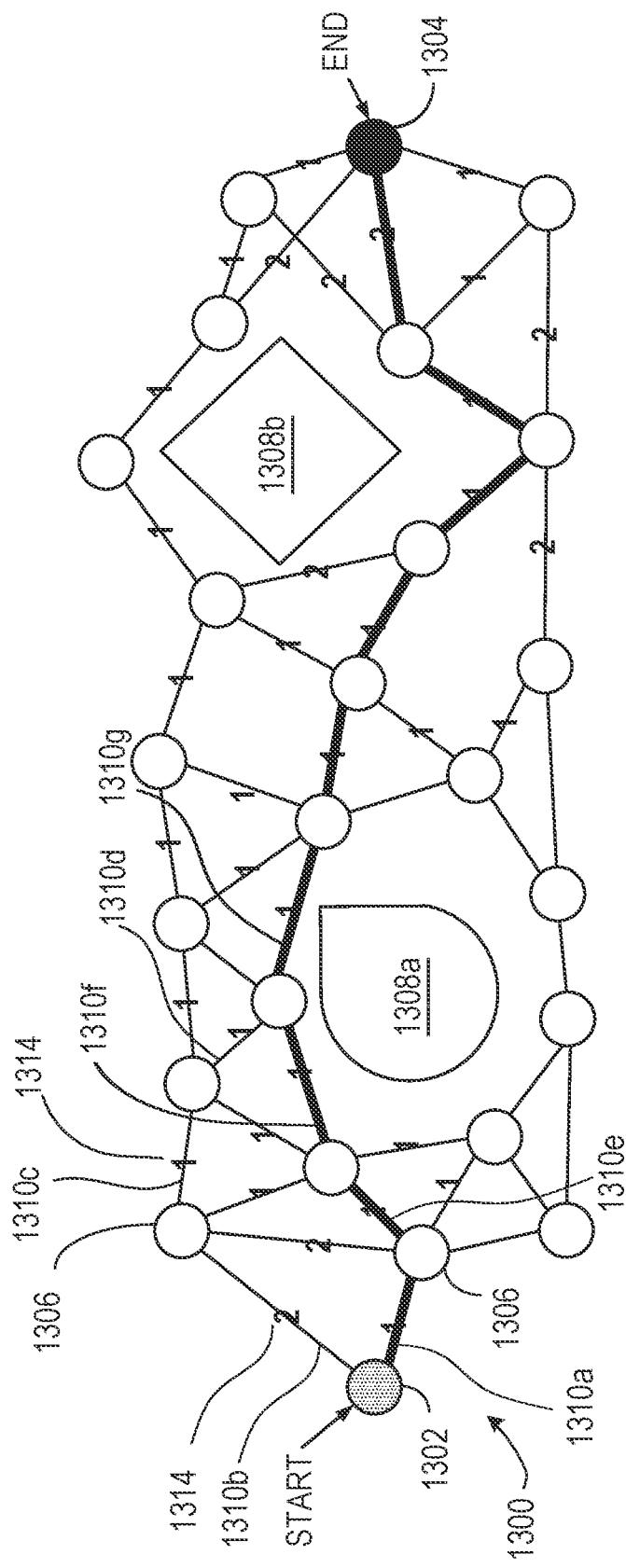
FIGS. 13A and 13B show a directed graph used for determining a route in accordance with some embodiments.
Figure 13B:
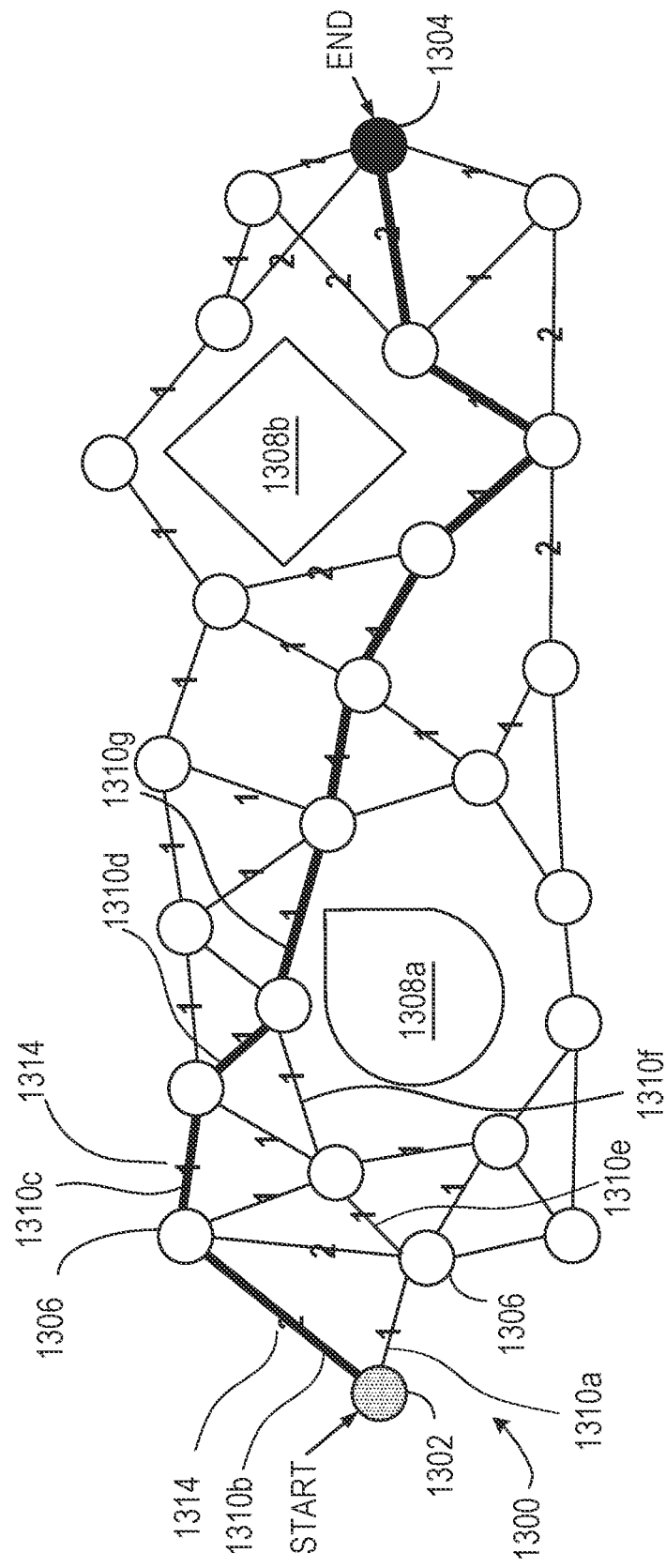

FIGS. 13A and 13B show a directed graph 1300 similar to that shown in FIG. 10 and discussed above. Directed graph 1300 includes start point 1302, end point 1304, nodes 1306, objects 1308, and edges 1310. Edges 1310 represent roads or streets and collectively form a variety of routes that can be used for traversing from start point 1302 to end point 1304. A cost 1314 is associated with each edge 1310 (shown in FIGS. 13A and 13B as a value of "1" or "2"), representing a value for the resources (e.g., time) that are expended if the AV uses the respective edge. Bolded edges 1310, such as edge 1310*a* in FIG. 13A, represent an edge that forms at least a portion (e.g., a route segment) of a currently selected route for traversing from start point 1302 to end point 1304. Edges 1310 that are not bolded, such as edge 1310*b* in FIG. 13A, represent edges that are not currently selected as a portion of the route to be traversed. Edges 1310 can change from a non-bolded state to a bolded state, and vice versa, in response to being selected (or unselected to become non-bolded) for the route.

In the embodiments disclosed herein, various formulas are used for determining or selecting a route using directed graph 1300. For example, directed graph 1300 is represented as $\mathcal{G}(\mathcal{V}, \mathcal{E})$ with node set V and edge set $\varepsilon \subseteq V \times V$. Additionally, cost $T_{t,ij}$ represents the travel time associated with edge $ij \in \varepsilon$. In some embodiments, the quantity of cost $T_{t,ij}$ can be a function of time or congestion (e.g., traffic or construction).

In the embodiment shown in FIG. 13A, the selected route is determined by choosing edges 1310 that, collectively, minimize the cost (for example, the amount of time) to travel from start point 1302 to end point 1304. In some embodiments, the cost of traveling a particular route—represented in this example as the amount of time to travel the route—is calculated using formula (1), which is referred to herein as the cost function and is represented as follows:

$$\min_{ij \in \varepsilon} \sum_{ij \in \varepsilon} T_{t,ij} \qquad (1)$$
$$\text{s.t.} \quad \text{start in } A$$
$$\text{arrive in } B$$

where A and B denote the starting and ending points (e.g., start point 1302 and end point 1304), respectively, of the trip. The optimal value, or solution, for the cost function of formula (1) is represented as minimum travel time T*. In this embodiment, minimum travel time T* is achieved using the bolded edges 1310 shown in FIG. 13A.

As discussed above, the AV can be tasked with obtaining updated map data. In some embodiments, this can be performed while transporting the rider from start point 1302 to end point 1304. Specifically, the route used to transport the rider from start point 1302 to end point 1304 is determined (e.g., by planning module 404) in a manner that selectively incorporates edges 1310 according to the benefit obtained by traversing particular edges (e.g., the opportunity to collect updated map data for an unmapped road or a road that has not been recently surveyed). This permits use of the AV to obtain the updated map data, while concurrently generating revenue through operation of the AV, for example, in a rideshare service.

An example of such a route is illustrated in FIG. 13B, where edges 1310*b*, 1310*c*, and 1310*d* are shown bolded, and previously bolded edges 1310*a*, 1310*e*, and 1310*f* are now shown non-bolded. In this embodiment, edges 1310*b*, 1310*c*, and 1310*d* represent edges that are selected due to the benefit of obtaining updated map data for those respective edges, despite a potential increase in the time it takes to travel from start point 1302 to end point 1304 compared to the route bolded in FIG. 13A. That is, the route shown in FIG. 13B varies from that shown in FIG. 13A by selecting edges 1310*b*, 1310*c*, and 1310*d* instead of edges 1310*a*, 1310*e*, and 1310*f*, so that updated map data can be obtained for edges 1310*b*, 1310*c*, and 1310*d*. Note that edge 1310*g* remains bolded because that portion of the route remains unchanged. Because a cost 1314 is associated with each respective edge 1310, the cost of using edges 1310b, 1310c, and 1310d instead of edges 1310a, 1310e, and 1310f is a net increase of 1, meaning more resources (e.g., time) are expended to travel the route in FIG. 13B instead of the route in FIG. 13A.

In some embodiments, the edges 1310 that are selected for the route are determined based, at least in part, on the amount of time elapsed since updated map data was obtained for those respective edges. For example, formula (2), shown below, represents a calculation for determining a route that deviates from the optimal route determined using formula (1) in order to obtain updated map data for certain edges. In the present example, formula (2) can be used to determine the route shown in FIG. 13B.

Formula (2) is as follows:

$$\min_{ij \in \varepsilon} \sum_{ij \in \varepsilon} (T_{t,ij} + \alpha T_{u,ij}) \quad (2)$$

s.t. start in $A$ arrive in $B$ $T_{u,ij}$ represents the inverse of the amount of time elapsed since the last map data update for edge $ij \in \varepsilon$, with the quantity of $T_{u,ij}$ depending on the age of the map data (not time or congestion) for the respective edge. Factor $\alpha$ represents the tradeoff factor, which can be set by the operator of the AV and serves as a variable for biasing the equation towards selecting edges with older map data instead of performing a trip in the optimum amount of time. In other words, factor $\alpha$ represents a tolerance for deviating from the optimal route in order to obtain updated map data for edges where the benefit of obtaining updated map data for those edges outweighs the cost of increasing the duration of the route. Thus, the greater the value of factor $\alpha$, the greater the amount of tolerated deviation from the optimal route calculated using formula (1). Conversely, the smaller the value of factor $\alpha$, the less the amount of tolerated deviation from the optimal route calculated using formula (1).

In some embodiments, $T_{u,ij}$ and factor $\alpha$ represent benefit factors that are used to ascribe a quantitative value to the benefit that is achieved by obtaining updated map data (or sensor calibration, or advertisement revenue, as the case may be) using a respective route. The value of the benefit can vary for each potential route. For example, one route may provide a greater benefit over a second route because it provides a greater reduction in the age of the map data with less deviation from the optimal route.

The solution of formula (2) is represented as $\tilde{T}^*$. In the case of an equally up-to-date map for the edges, $T_{u,ij}=\overline{T}$. Thus, $T^*=\tilde{T}^*$, meaning that the route determined using formula (2) corresponds to the minimum time route (for the case in which the edges are all equally up-to-date). Put another way, when the map data is equally up-to-date, the system (e.g., planning module 404) determines the route to be the same as the optimal route produced by formula (1).

In embodiments in which the edges are not equally up-to-date, the two values $T^*$ and $\tilde{T}^*$ can have different values. In such embodiments, the relative travel time increment (the cost difference) between the two routes (e.g., the optimal route of formula (1) and the route determined using formula (2)) is represented as $$\Delta T = \frac{(\tilde{T}^* - T^*)}{T^*}.$$

When this value is greater than zero, the travel time of the determined route is greater than the travel time of the optimal route, meaning that the user (rider) is arguably inconvenienced or disadvantaged by traversing the determined route, because it will take the rider a greater amount of time to arrive at end point 1304. Accordingly, a dynamic pricing scheme can, in some embodiments, be used in order to incentivize the rider to choose the longer route—that is, the route that permits the AV to obtain the updated map data.

Formula (3) can be used to determine a new price $\tilde{C}$, where $\overline{C}$ represents the price of the optimal route of formula (1). Formula (3) is as follows:

$$\tilde{C} = \overline{C}(1 - \beta \Delta T), \quad (3)$$

where $\beta$ represents the discount factor applied (e.g., set by an operator of the AV) to the pricing structure. In some embodiments, $\beta$ can be determined based on customer satisfaction (e.g., how sensitive customers are to increased trip times or cost). In some embodiments, $\beta$ can be determined as a function of factor $\alpha$. For example, as factor $\alpha$ increases, discount factor $\beta$ proportionally increases (e.g., the more value an operator gives to keeping the map up-to-date, the greater the discount the operator is willing to provide).

As briefly discussed above, the embodiments disclosed herein can be implemented to achieve benefits other than to obtain updated map data. In some embodiments, the route selection and discount pricing structure can be applied when the cost associated with the edges is "static," meaning that the cost does not depend on time or traffic conditions. For example, the route can be determined or modified to select edges that permit the AV to perform sensor calibration functions while transporting the rider. In some embodiments, different routes may be more suitable than others for performing the sensor calibration process. Accordingly, a route can be determined to optimize performance of sensor calibration while providing a discount to the rider in exchange for agreeing to a determined route that results in improved sensor calibration, but also deviates from the optimal route. In this example, cost $C_{c,ij}$ is the cost associated with edge $ij \in \varepsilon$, which is a measurement of how unsuitable a road is for calibration purposes. Thus, in this example, cost $C_{c,ij}$ is substituted for cost $T_{t,ij}$ in formula (1).

As another example, the route can be determined or modified to select edges such that a specific entity is promoted while traversing the route. For example, the route may pass by an advertisement for the entity or the entity is located or visible along the route. In such embodiments, some or all of the discount provided to the rider can be supplemented by advertising revenue provided by the entity being promoted along the determined route. In this example, cost $C_{b,ij}$ is the cost associated with edge $ij \in \varepsilon$, which is a measurement of how much the cost of driving that specific edge is borne by the operator of the AV and is not shared with the promoted entity. Thus, in this example, cost $C_{b,ij}$ is substituted for cost $T_{t,ij}$ in formula (1).

In some embodiments, the AV operates in accordance with a minimum violation planner (e.g., incorporated in planning module 404, for example), which operates by means of a set of multilevel costs, where each cost has an associated priority ranging, for example, from safe behaviors such as "do not collide" to preferred behavior such as "avoid non-smooth actions" (e.g., accelerations above a determined threshold). However, when collecting map data, the information gained can be increased through proper maneuvers that oftentimes violate the rules of the minimum violation planner. Accordingly, the AV is unable to perform the maneuvers that optimize map data collection.

In some embodiments, the disclosed techniques involve determining route planning data for a route of an AV (e.g., including modifying a driving behavior of the AV) so that the AV can collect updated map data for one or more sections (e.g., edges) of the route while also transporting the user of the AV (e.g., the rider) to a destination (e.g., end point 1304). For example, rather than (or in addition to) modifying the route itself, the system (e.g., planning module 404) determines route planning data (e.g., embodied as a set of driving behaviors that can be performed (e.g., using control module 406) on a particular edge in order to collect updated map data for the edge). In some embodiments, this is accomplished by encoding specific map-update-dependent objectives at the lower levels of the cost function, such as those associated with preferred behavior. Modifying the behaviors at the "preferred behavior" level ensures that proper safety requirements are maintained (e.g., by behaviors at the "safe behaviors" level), while increasing capability of the AV to collect map data at the expense of "comfort" driving behaviors that have fewer safety implications. This also ensures that the driving behavior of the AV conforms to well established safety requirements and legal regulations.

For example, in some embodiments, when the AV is traversing the respective edge, the AV switches from (or to) a standard set of driving behaviors, including the standard (non-modified) behaviors at the "preferred behavior" level, to (or from) a modified set of driving behaviors—that is, the modified behaviors at the "preferred behavior" level. The standard set of driving behaviors corresponds to a set of maneuvers or driving behaviors that are permitted for normal, standard operation of the AV. For example, these may include an acceptable frequency of switching lanes, permissible acceleration and braking rates, a permissible driving distance from objects such as other cars, street signs, sidewalks, curbs, or other street boundaries, and a permissible amount of time for traveling in a particular lane (e.g., a passing lane or lanes designated for faster or slower driving speeds). The modified set of driving behaviors generally correspond to behaviors or maneuvers that are used for collecting map data and are otherwise not permitted for normal, standard operation of the AV. For example, the modified behaviors permit an increased frequency for switching lanes, more aggressive acceleration and braking rates, and/or an increased permissible amount of time driving in particular lanes. In some embodiments, the modified set of behaviors include more relaxed distance tolerances so that the AV can operate at a closer distance to objects such as other cars, street signs, sidewalks, curbs, or other street boundaries.

In some embodiments, when the modified set of behaviors affect the travel time, a modified pricing structure can be implemented, similar to that discussed above, to incentivize the user/rider to accept the modified driving behaviors for the portion of the route.

In some embodiments, the system switches between the standard driving behaviors and the modified driving behaviors, depending on whether there is a benefit to executing the modified driving behaviors that outweighs the advantages (e.g., ride comfort) of operating using the standard driving behaviors. For example, the system can determine to operate the AV using the modified driving behaviors in order to obtain map data that cannot otherwise be obtained using the standard driving behaviors. As another example, the system can determine to operate the AV using the modified driving behaviors in order to improve the quality of the map data obtained for a particular area (e.g., edge). updated map data is being collected for a particular edge. Referring to the example discussed above, the AV operates using the modified set of driving behaviors when traversing edges 1310*b*, 1310*c*, and 1310*d* of the route in FIG. 13B, and then switches to the standard driving behaviors when traversing the remaining edges 1310 (such as edge 1310*g*, for example). In some embodiments, the AV is configured to obtain map data while operating using either set of driving behaviors (e.g., standard or modified), and can switch between either set of driving behaviors as desired.

In some embodiments, the disclosed techniques include modifying the driving behavior, in a manner similar to that discussed above, in order to perform tasks other than collecting updated map data. For example, the system can modify the set of driving behaviors in order to perform sensor calibration of the AV when traversing particular edges of the route.

The embodiments provided herein discuss techniques for determining or modifying a route and/or set of driving behaviors for the AV when transporting a rider from a start point to an end point. However, in some embodiments, the route and/or driving behaviors can be determined for instances when a rider is not occupying the AV. For example, the system can determine a route (and/or driving behavior) so that map data is collected (or sensor calibration is performed) for specific edges of a route that is used when the AV is in route to a rider. As another example, unused AVs can be rerouted using the above techniques in order to collect map data or perform sensor calibration as discussed above.

Example Process for Determining a Route

Figure 14:
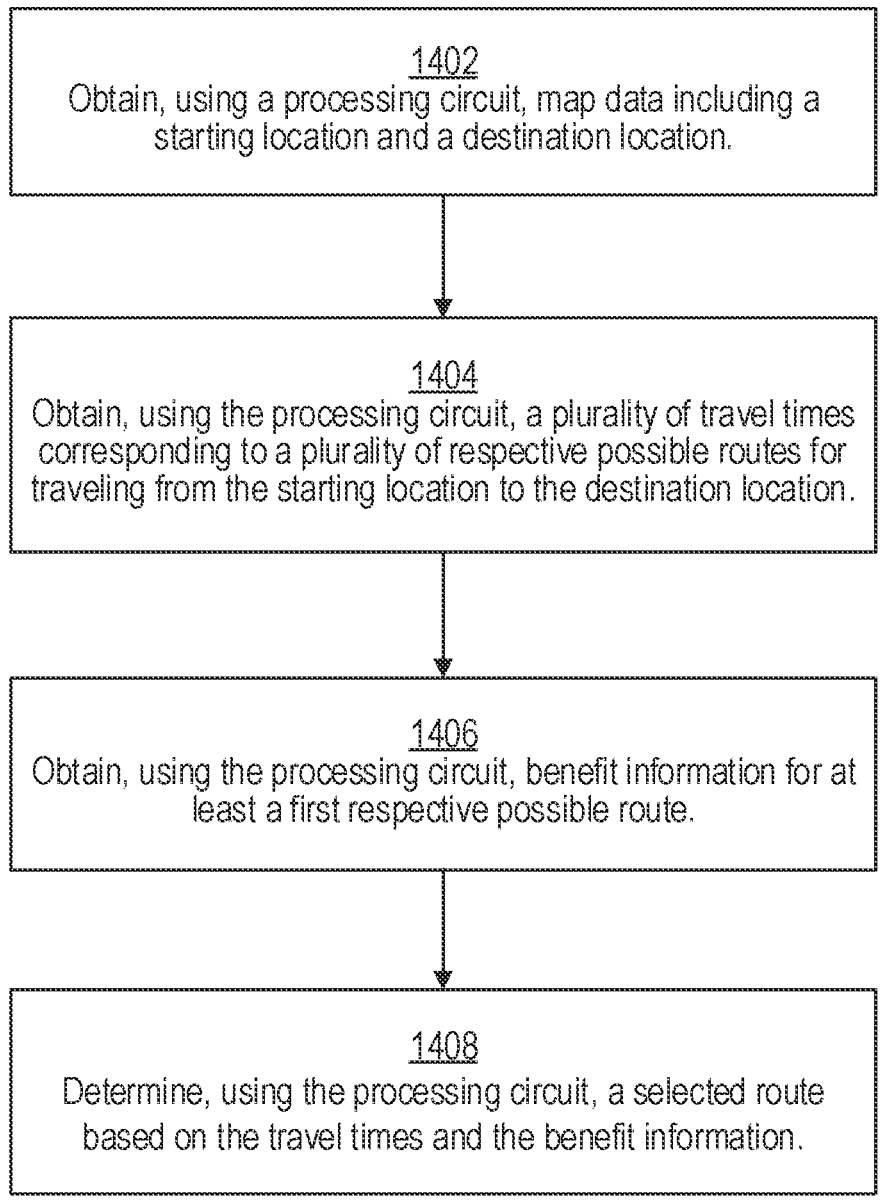
FIG. 14 is a flow chart of an example process for determining a route.

FIG. 14 is a flow chart of an example process 1400 (also referred to as a method) for determining a route (e.g., a trajectory) of an autonomous vehicle (e.g., AV 100) in order to update map data used for navigating an autonomous vehicle in accordance with the embodiments discussed above. For convenience, process 1400 will be described as being performed by a system of one or more computers located in one or more locations. For example, AV system 120 of FIG. 1 (optionally combined with one or more components of computer system 300 and/or architecture 400), appropriately programmed in accordance with this specification, can perform the process 1400. As another example, the computer system 300 of FIG. 3 (optionally combined with one or more components of AV system 120 and/or architecture 400), appropriately programmed in accordance with this specification, can perform the process 1400. As yet another example, architecture 400 of FIG. 4 (optionally combined with one or more components of computer system 300 and/or AV system 120), appropriately programmed in accordance with this specification, can perform the process 1400.

At 1402, the system (e.g., 120, 300, 400, or a combination thereof) obtains, using a processing circuit (e.g., planning module 404) (e.g., computing processor 146), map data including a starting location (e.g., starting point 1302) and a destination location (e.g., end point 1304) (e.g., a route starting location and a route destination location).

At 1404, the system (e.g., 120, 300, 400, or a combination thereof) obtains, using the processing circuit (e.g., planning module 404) (e.g., computing processor 146) (e.g., and based on the map data), a plurality of travel times (e.g., sums of costs 1314; formula (1)) corresponding to a plurality of respective possible routes for traveling from the starting location to the destination location (e.g., potential routes that can be formed using edges 1310 in directed graph 1300). In some embodiments, obtaining the plurality of travel times corresponding to the plurality of respective possible routes includes determining a plurality of possible routes for traveling via the autonomous vehicle from the starting location to the destination location and determining, for each of the respective possible routes, a travel time for traveling from the starting location to the destination location using the respective route. In some embodiments, each route is comprised of multiple segments (e.g., 1310) (e.g., roads or streets), where each segment of the route is associated with a time (e.g., cost 1314) for traversing that segment of the route. In such embodiments, the travel time for the route is the sum of the travel times for each segment of the route (see formula (1)). In some embodiments, the travel times are determined offline or by a remote server. In some embodiments, the travel times are determined based on an expected amount of time to travel along a respective route or segment of the route based on travel conditions (e.g., traffic, road closures, road construction, weather conditions) at a determined time (e.g., a current or future start time or at any time while traveling from the starting location to the destination location).

In some embodiments, the plurality of travel times includes respective travel times associated with respective edges (e.g., roads (e.g., streets) that can make up (form) all, or a segment, of one or more of the possible routes) comprising (e.g., making up, forming) the plurality of respective possible routes.

At 1406, the system (e.g., 120, 300, 400, or a combination thereof) obtains, using the processing circuit (e.g., planning module 404) (e.g., computing processor 146), benefit information (e.g., benefit factors) for at least a first respective possible route. In some embodiments, the benefit information (e.g., formula (2)) includes benefit factors that can be used to determine a quantitative value associated with a benefit for traveling a particular one of the possible routes or for traveling particular segments of a particular one of the possible routes. In some embodiments, obtaining the benefit information includes determining a magnitude of a benefit (e.g., a value associated with receiving the benefit). In some embodiments, a benefit can include, for example, updating mapping information for a road included in a particular route (e.g., a segment of the route). As another example, a benefit can include performing sensor calibration for one or more sensors on the AV using a particular route or segment of a route. As another example, a benefit can include revenue (e.g., advertising revenue) that can be earned or generated by traveling a particular route or segment of a route.

In some embodiments, the benefit information includes one or more benefit factors associated with at least a portion (e.g., a segment 1310) of the first respective possible route. In some embodiments, benefit factors are used to determine a quantitative value associated with a benefit for traveling a particular one of the possible routes or for traveling particular segments of a particular one of the possible routes. In some embodiments, the benefit factors are weighted (e.g., see factor α), wherein the weighted value controls an amount of deviation from a possible route having a minimum sum of travel times for the route.

In some embodiments, the benefit factors (e.g., $T_{u,ij}$) are inversely proportional to a magnitude of a benefit associated with the portion of the first respective possible route. In some embodiments, the magnitude of the benefit represents a value of receiving the benefit. For example, the greater the magnitude of the benefit, the greater the value for receiving the benefit (or, put another way, the greater the need for receiving the benefit). In some embodiments, the magnitude of the benefit is based on (e.g., proportional to) an amount of time elapsed since the benefit has been received and, consequently, the benefit factor is inversely proportional to the amount of time elapsed since the benefit has been received. For example, if the benefit is updating mapping information for a segment of a possible route, then the magnitude of the benefit increases with the amount of time elapsed since the previous mapping update was performed/received for the segment. Because the benefit factor is inversely proportional to the magnitude of the benefit, the benefit factor decreases as the amount of time increases since the mapping information was updated for the segment of the possible route. In embodiments that determine the selected route by minimizing the sum of travel times and weighted benefit factors associated with the possible routes, decreasing the benefit factor of a route (or segment of a route) makes it more likely that the route (or a route including the segment) will be determined to be (e.g., selected as) the selected route.

In some embodiments, the benefit factors include one or more map age factors (e.g., $T_{u,ij}$) (e.g., factors that correspond to an age or availability of map data for respective portions (e.g., segments) of the possible route associated with the benefit factors). In some embodiments, the map age factors indicate whether map data has been collected for a respective segment of a possible route and, if so, an amount of time elapsed since the map data was collected or received (an age of the map data). In some embodiments, the map age factors are inversely proportional to an amount of time elapsed since map data was collected for the portion of the first respective possible route.

In some embodiments, the benefit factors include one or more calibration suitability factors (e.g., factors that indicate how suitable a respective portion (e.g., segment) of the possible route is for performing calibration operations for one or more sensors of the AV). In some embodiments, the calibration suitability factors are inversely proportional to a determination of how unsuitable the portion of the first respective possible route is for performing sensor calibration. In some embodiments, the calibration suitability factors are proportional to a determination of how suitable the portion of the possible route is for performing sensor calibration.

In some embodiments, the benefit factors include one or more advertisement revenue factors (e.g., factors that indicate a financial benefit (e.g., commission) that is achievable by navigating the AV along the portion of the possible route). In some embodiments, the financial benefit is a commission that is paid by a third party. For example, the third party may pay the commission to the operator of the AV, the user of the AV, or a combination thereof, in exchange for navigating the AV along a specific portion of the route. For example, the third party can be associated with a business, retailer, advertiser, or other party that is interested in promoting a product or service that is visible when the AV navigates the respective portion of the possible route (e.g., a restaurant that is located along the portion of the route).

In some embodiments, the advertisement revenue factors are inversely proportional to a magnitude of a financial benefit (e.g., a financial incentive or commission provided by a third party) available to an operator of the autonomous vehicle (e.g., a party (e.g., person and/or entity) responsible for managing or controlling operation of the AV (e.g., an owner of the AV, a company responsible for deploying the AV, etc.)) in response to navigating the autonomous vehicle along the portion of the first respective possible route. In some embodiments, the advertisement revenue factors are proportional (e.g., directly proportional) to expenses incurred by the operator of the autonomous vehicle (e.g., expenses that are not subsidized by the third party or off-set by the financial benefit) in response to navigating the AV along the portion of the first respective possible route.

At 1408, the system (e.g., 120, 300, 400, or a combination thereof) determines, using the processing circuit (e.g., planning module 404) (e.g., computing processor 146), a selected route (e.g., the route in FIG. 13B) based on the travel times and the benefit information. In some embodiments, determining the selected route based on the travel times and the benefit information includes selecting one of the possible routes that provides a minimum value for the sum of: a) the travel times for the possible routes (e.g., the travel times for the segments comprising a possible route), and b) weighted benefit factors of the possible routes (e.g., segments comprising a possible route). In some embodiments, the method further includes navigating, using a control circuit (e.g., control module 406), the AV from the starting location to the destination location using the selected route.

In some embodiments, determining the selected route based on the travel times and the benefit information includes selecting, from the plurality of respective possible routes, a first route (e.g., the route in FIG. 13B) having a minimum value for a sum of: a) the travel times for traveling from the starting location to the destination location (e.g., the total of the travel times for the route segments comprising the first route), and b) weighted benefit factors for respective ones of the plurality of respective possible routes (e.g., the total of the weighted benefit factors for the route segments comprising the first route). In some embodiments, each of the respective possible routes is calculated to have a sum of travel times for the respective route (e.g., a total travel time), which is the sum of the travel times for each route segment comprising the respective route. Additionally, each of the respective possible routes is calculated to have a sum of the benefit factors for the respective route (e.g., a total benefit amount), which is the sum of the weighted (or, optionally, unweighted) benefit factors for each route segment comprising the respective route. In some embodiments, the selected route is the route that provides the minimum sum of: a) the total travel time, and b) the total benefit amount.

In some embodiments, the system (e.g., 120, 300, 400, or a combination thereof) determines, using the processing circuit (e.g., planning module 404) (e.g., computing processor 146), a first cost function (e.g., $\hat{T}^*$ of formula (2)) of a second route (e.g., the selected route) of the plurality of respective possible routes (e.g., a cost associated with operating or riding in the AV using the second route) based on the travel times and the benefit information for the second route (e.g., a minimum value for a sum of: a) the travel times for traveling from the starting location to the destination location, and b) weighted benefit factors for the plurality of respective possible routes). In some embodiments, the system determines, using the processing circuit, a second cost function (e.g., $T^*$ of formula (1)) of a third route of the plurality of respective possible routes (e.g., a cost associated with operating or riding in the AV using the third route) based on a minimum sum of travel times for traveling from the starting location to the destination location (e.g., without considering benefit information for the third route). In some embodiments, the system determines, using the processing circuit, a discount price (e.g., new price $\tilde{C}$ of formula (3)) based on a difference between the first cost function and the second cost function. In some embodiments, various ones of the respective possible routes can have different discounts associated with a cost for riding in the AV using the respective route, based on the cost functions determined for each of the respective possible routes. For example, one route option can be heavily discounted as compared to a different route option depending upon the length of the detour (e.g., distance, time, or some combination thereof) the AV will take before arriving at the destination.

In some embodiments, the difference between the first cost function and the second cost function is based on a time difference between: a) a first amount of time to travel from the starting location to the destination location using the second route, and b) a second amount of time to travel from the starting location to the destination location using the third route. In some embodiments, the time to travel from the starting location to the destination location varies depending on the route selected. In some embodiments, a user or customer of the AV can be incentivized to select a route that will have a greater travel time by offering a discount to the user to select the route with the greater travel time. In some embodiments, the discount is determined based on the additional amount of time it will take to arrive at the destination location (as compared to an optimal route that has a minimal travel time), and, optionally, based on the magnitude of the benefit that will be realized by the operator of the AV for traveling the selected route. For example, the longer route can provide a benefit to the operator of the AV such as allowing for updating mapping information along the route, performing sensor calibration, and/or generating revenue.

Example Process for Determining Route Planning Data for a Route

Figure 15:
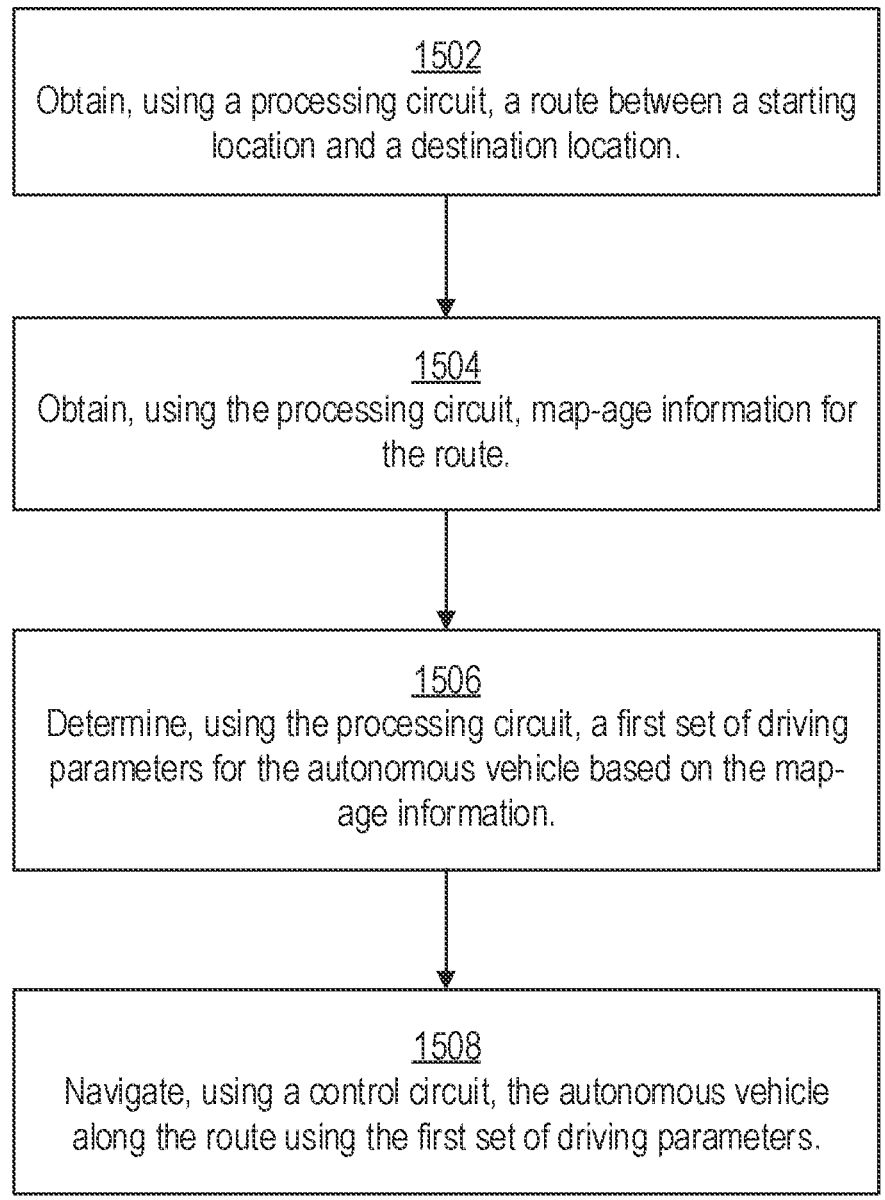
FIG. 15 is a flow chart of an example process for determining route planning data for a route.

FIG. 15 is a flow chart of an example process 1500 (also referred to as a method) for determining route planning data (e.g., a driving motion for a route or trajectory) for a route of an autonomous vehicle (e.g., AV 100) in order to update map data used for navigating an autonomous vehicle in accordance with the embodiments discussed above. For convenience, process 1500 will be described as being performed by a system of one or more computers located in one or more locations. For example, AV system 120 of FIG. 1 (optionally combined with one or more components of computer system 300 and/or architecture 400), appropriately programmed in accordance with this specification, can perform the process 1500. As another example, the computer system 300 of FIG. 3 (optionally combined with one or more components of AV system 120 and/or architecture 400), appropriately programmed in accordance with this specification, can perform the process 1500. As yet another example, architecture 400 of FIG. 4 (optionally combined with one or more components of computer system 300 and/or AV system 120), appropriately programmed in accordance with this specification, can perform the process 1500.

At 1502, the system (e.g., 120, 300, 400, or a combination thereof) obtains, using a processing circuit (e.g., planning module 404) (e.g., computing processor 146), a route (e.g., trajectory) (e.g., the route in FIG. 13B) between a starting location (e.g., start point 1302) and a destination location (e.g., end point 1304) (e.g., a route starting location and a route destination location determined based on map data that includes the starting location and the destination location). In some embodiments, obtaining the route between the starting location and the destination location includes determining the route based on map data that includes the starting location and the destination location. In some embodiments, the route is determined offline or by a remote server. In some embodiments, the route is comprised of one or more edges (e.g., 1310) (e.g., roads that can comprise all, or a segment, of the route).

At 1504, the system (e.g., 120, 300, 400, or a combination thereof) obtains, using the processing circuit (e.g., planning module 404) (e.g., computing processor 146), map-age information (e.g., map age/availability factors) for the route. In some embodiments, the map-age information includes map age/availability factors (e.g., $T_{u,ij}$) that indicate an amount of time elapsed since map data was updated or obtained for one or more roads (e.g., segments) comprising the route. In some embodiments, obtaining the map-age information includes determining one or more map age/availability factors based on the map data used to determine the route between the starting location and the destination location.

At 1506, the system (e.g., 120, 300, 400, or a combination thereof) determines, using the processing circuit (e.g., planning module 404) (e.g., computing processor 146), a first set of driving parameters (e.g., predetermined rules for controlling navigation behavior of the autonomous vehicle) for the autonomous vehicle (e.g., AV 100) based on the map-age information. In some embodiments, the first set of driving parameters are influenced by the map age/availability factors. For example, if the map age/availability factors indicate map data for a portion of the route (e.g., a route segment) needs to be updated (e.g., the map data is older than a threshold amount of time), the first set of driving parameters can be determined to include parameters for controlling the autonomous vehicle to collect map data for the portion of the route (e.g., using control functions such as, for example, control functions 420).

In some embodiments, the first set of driving parameters includes a set of predetermined maneuvers (e.g., maneuvers that are determined to be acceptable or safe for operating the AV) for operating the autonomous vehicle. In some embodiments, an amount of maneuvers in the set of predetermined maneuvers (e.g., acceptable maneuvers, permitting driving behaviors) for operating the autonomous vehicle is proportional to an amount of time elapsed since the map-age information was updated for at least a portion of the route. In some embodiments, the number of acceptable maneuvers for operating the AV increases as more time elapses since the map data for a portion (e.g., segment) of the route was updated. In other words, as the map data for the route ages, additional maneuvers are permitted for operating the AV along the route. For example, the additional maneuvers correspond to maneuvers for updating map data for the route. In some embodiments, the set of predetermined maneuvers (e.g., acceptable maneuvers) includes one or more of: a permissible frequency of switching lanes, a permissible distance from one or more road boundaries (e.g., curbs or sidewalks), or a permissible amount of time travelling in a particular lane (e.g., lanes that are typically designated for higher or lower rates of speed).

In some embodiments, the first set of driving parameters is different from a second set of driving parameters that is not based on the map-age information (e.g., a predefined set of driving parameters). In some embodiments, the set of predefined driving parameters are used for navigating the AV by default (e.g., without considering the map-age information). In some embodiments, a set of driving parameters used for navigating the AV are changed from the predefined driving parameters to the first set of driving parameters (e.g., the set of driving parameters that are based on the map-age information), depending on one or more map-age factors of the map-age information. For example, if the map-age factors indicate that map data for a portion of the route needs to be updated, then the driving parameters for navigating the AV along the route is switched (for at least the portion of the route) from the predefined set of driving parameters to the first set of driving parameters.

In some embodiments, the first set of driving parameters includes a set of maneuvers (e.g., permitted driving behaviors) for operating the autonomous vehicle to collect map data (e.g., maneuvers that are performed while collecting map data along at least a portion of the route), and the second set of driving parameters (e.g., the predefined set of driving parameters) does not include the set of maneuvers for operating the autonomous vehicle to collect map data. In some embodiments, the maneuvers that are performed while collecting map data along at least a portion of the route include one or more of the following maneuvers: switching lanes more frequently than is permitted when operating the AV using the predetermined set of driving parameters, maneuvering the AV within a distance from the road boundaries than is permitted when operating the AV using the predetermined set of driving parameters, travelling in a particular lane for a greater amount of time than is permitted when operating the AV using the predetermined set of driving parameters, and accelerating or braking more aggressively than is permitted (without justification such as to avoid a collision) when operating the AV using the predetermined set of driving parameters.

In some embodiments, a permissible frequency of switching lanes is greater in the first set of driving parameters than in the second set of driving parameters. In some embodiments, a permissible distance from one or more road boundaries (e.g., curbs or sidewalks) is less in the first set of driving parameters than in the second set of driving parameters. In some embodiments, a permissible amount of time travelling in a particular lane (e.g., lanes that are typically designated for higher or lower rates of speed) is greater in the first set of driving parameters than in the second set of driving parameters.

At 1508, the system (e.g., 120, 300, 400, or a combination thereof) navigates (e.g., controls operation (e.g., driving) of the AV), using a control circuit (e.g., control module 406), the autonomous vehicle (e.g., AV 100) along the route (e.g., the route in FIG. 13B) using the first set of driving parameters (e.g., controlling navigation of the autonomous vehicle in accordance with the driving parameters). In some embodiments, navigating the autonomous vehicle along the route using the first set of driving parameters includes navigating the autonomous vehicle with a first set of driving behaviors (e.g., behaviors that do not include performing map data collection) on a first segment of the route (e.g., bolded edge 1310g in FIG. 13B), and navigating the autonomous vehicle with a second set of driving behaviors different from the first set of driving behaviors (e.g., behaviors that include performing map data collection) on a second segment of the route (e.g., bolded edge 1310d in FIG. 13B). In some embodiments, navigating the autonomous vehicle along the route using the first set of driving parameters includes navigating the autonomous vehicle with a first subset of driving parameters on a first segment of the route, and navigating the autonomous vehicle with a second subset of driving parameters different from the first subset of driving parameters on a second segment of the route.

In some embodiments, navigating the autonomous vehicle along the route using the first set of driving parameters includes performing a map data collection operation (e.g., collecting map data) for at least a portion of the route (e.g., one or more segments of the route) while navigating the autonomous vehicle along the route between the starting location and the destination location.

In some embodiments, the system (e.g., 120, 300, 400, or a combination thereof) obtains, using the processing circuit (e.g., planning module 404 and/or perception module 402) (e.g., computing processor 146), route conditions (e.g., traffic conditions, weather conditions, road surface conditions, AV location along the route) for the route. In some embodiments, determining the first set of driving parameters includes determining the first set of driving parameters for the autonomous vehicle based on the map-age information and the route conditions. In some embodiments, the route conditions are updated in real time. In some embodiments, the route conditions provide an indication of whether the route is suitable (e.g., whether it is safe and/or effective to operate the AV on at least a portion of the route using a set of driving parameters) for a respective set of driving parameters (e.g., the first set of driving parameters).

In some embodiments, the route conditions include traffic conditions for at least a portion of the route. In some embodiments, the traffic conditions indicate whether a portion of the route is congested, for example, as a result of traffic, construction, an accident, etc.

In some embodiments, the route conditions include weather conditions for at least a portion of the route. In some embodiments, the weather conditions indicate whether a portion of the route is experiencing (or recently experienced) rain, snow, sleet, sun, wind, etc.

In some embodiments, the route conditions include an indication of a location (e.g., a geographical location) of the autonomous vehicle along the route. In some embodiments, the route conditions indicate progress of the AV along the route and/or a representation of the AV along a representation (e.g., a map) of the route.

In some embodiments, the route conditions include road surface conditions for at least a portion of the route. In some embodiments, the road surface conditions indicate whether the road along a portion of the route is wet, dry, icy, under construction, etc.

In some embodiments, the system (e.g., 120, 300, 400, or a combination thereof) determines, using the processing circuit (e.g., planning module 404) (e.g., computing processor 146), a first cost function (e.g., $\tilde{T}^*$ of formula (2)) of the route based on a first travel time for navigating the autonomous vehicle along the route using the first set of driving parameters (e.g., a set of driving parameters that are based, at least in part, on the map-age information). In some embodiments, the system determines, using the processing circuit, a second cost function (e.g., $T^*$ of formula (1)) of the route based on a second travel time for navigating the autonomous vehicle along the route using a third set of driving parameters that are not based on the map-age information (e.g., the predefined set of driving parameters). In some embodiments, the system determines, using the processing circuit, a discount price (e.g., new price $\check{C}$ of formula (3)) based on a difference between the first cost function and the second cost function. In some embodiments, the route can be associated with different discounts based on the cost functions determined for the sets of driving parameters used while navigating the AV along the route. For example, when one set of driving parameters is used, the cost charged to a user (e.g., customer, passenger, etc.) for receiving a ride in the AV can be discounted as compared to when a different set of driving parameters is used depending, for example, upon the additional amount of time it will take to complete the route using the different set of driving parameters.

In some embodiments, the difference between the first cost function and the second cost function is based on a time difference between the first travel time and the second travel time. In some embodiments, the time to travel from the starting location to the destination location varies depending on the set of driving parameters used for navigating the AV along the route. In some embodiments, a user or customer of the AV can be incentivized to permit the AV to operate in accordance with the first set of driving parameters by offering a discount to the user. In some embodiments, the discount is determined based on the additional amount of time it will take to arrive at the destination location using the first set of driving parameters (as compared to the amount of time it will take when operating the AV in accordance with the predefined set of driving parameters). In some embodiments, the discount can be determined, optionally, based on the magnitude of a benefit that will be realized by the operator of the AV for traveling the route using the first set of driving parameters. For example, the first set of driving parameters can provide a benefit to the operator of the AV such as allowing for updating mapping information along the route, and the discount can be provided to the user (e.g., as a percentage of a quantified value for the benefit of obtaining updated mapping information) to reward the user for permitting the AV to operate using the first set of driving parameters. In some embodiments, the set of driving parameters can be selected to allow for other tasks or benefits such as, for example, performing sensor calibration and/or generating revenue. In such embodiments, the set of driving parameters can be determined to optimize performance of those tasks using the AV.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the disclosure, and what is intended by the applicants to be the scope, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

The following items describe embodiments of the disclosure:

1. A system comprising:
   one or more computer processors; and
   one or more non-transitory storage media storing instructions which, when executed by the one or more computer processors, cause performance of operations comprising:
   obtaining, using a processing circuit, map data including a starting location and a destination location;
   obtaining, using the processing circuit, a plurality of travel times corresponding to a plurality of respective possible routes for traveling from the starting location to the destination location;
   obtaining, using the processing circuit, benefit information for at least a first respective possible route; and
   determining, using the processing circuit, a selected route based on the travel times and the benefit information.

2. The system of item 1, wherein the plurality of travel times includes respective travel times associated with respective edges comprising the plurality of respective possible routes.

3. The system of any of items 1-2, wherein the benefit information includes one or more benefit factors associated with at least a portion of the first respective possible route.

4. The system of item 3, wherein the benefit factors are inversely proportional to a magnitude of a benefit associated with the portion of the first respective possible route.

5. The system of any of items 3-4, wherein the benefit factors include one or more map age factors.

6. The system of item 5, wherein the map age factors are inversely proportional to an amount of time elapsed since map data was collected for the portion of the first respective possible route.

7. The system of any of items 3-6, wherein the benefit factors include one or more calibration suitability factors.

8. The system of item 7, wherein the calibration suitability factors are inversely proportional to a determination of how unsuitable the portion of the first respective possible route is for performing sensor calibration.

9. The system of any of items 3-8, wherein the benefit factors include one or more advertisement revenue factors.

10. The system of item 9, wherein the advertisement revenue factors are inversely proportional to a magnitude of a financial benefit available to an operator of the autonomous vehicle in response to navigating the autonomous vehicle along the portion of the first respective possible route.

11. The system of any of items 1-10, wherein determining the selected route based on the travel times and the benefit information includes selecting, from the plurality of respective possible routes, a first route having a minimum value for a sum of: a) the travel times for traveling from the starting location to the destination location, and b) weighted benefit factors for respective ones of the plurality of respective possible routes.

12. The system of any of items 1-11, the operations further comprising:
    determining, using the processing circuit, a first cost function of a second route of the plurality of respective possible routes based on the travel times and the benefit information for the second route;
    determining, using the processing circuit, a second cost function of a third route of the plurality of respective possible routes based on a minimum sum of travel times for traveling from the starting location to the destination location; and
    determining, using the processing circuit, a discount price based on a difference between the first cost function and the second cost function.

13. The system of item 12, wherein the difference between the first cost function and the second cost function is based on a time difference between: a) a first amount of time to travel from the starting location to the destination location using the second route, and b) a second amount of time to travel from the starting location to the destination location using the third route.

14. A method for determining a route of an autonomous vehicle, the method comprising:
    obtaining, using a processing circuit, map data including a starting location and a destination location;
    obtaining, using the processing circuit, a plurality of travel times corresponding to a plurality of respective possible routes for traveling from the starting location to the destination location;
    obtaining, using the processing circuit, benefit information for at least a first respective possible route; and
    determining, using the processing circuit, a selected route based on the travel times and the benefit information.

15. The method of item 14, wherein the plurality of travel times includes respective travel times associated with respective edges comprising the plurality of respective possible routes.

16. The method of any of items 14-15, wherein the benefit information includes one or more benefit factors associated with at least a portion of the first respective possible route.

17. The method of item 16, wherein the benefit factors are inversely proportional to a magnitude of a benefit associated with the portion of the first respective possible route.

18. The method of any of items 16-17, wherein the benefit factors include one or more map age factors.

19. The method of item 18, wherein the map age factors are inversely proportional to an amount of time elapsed since map data was collected for the portion of the first respective possible route.

20. The method of any of items 16-19, wherein the benefit factors include one or more calibration suitability factors.

21. The method of item 20, wherein the calibration suitability factors are inversely proportional to a determination of how unsuitable the portion of the first respective possible route is for performing sensor calibration.

22. The method of any of items 16-21, wherein the benefit factors include one or more advertisement revenue factors.

23. The method of item 22, wherein the advertisement revenue factors are inversely proportional to a magnitude of a financial benefit available to an operator of the autonomous vehicle in response to navigating the autonomous vehicle along the portion of the first respective possible route.

24. The method of any of items 14-23, wherein determining the selected route based on the travel times and the benefit information includes selecting, from the plurality of respective possible routes, a first route having a minimum value for a sum of: a) the travel times for traveling from the starting location to the destination location, and b) weighted benefit factors for respective ones of the plurality of respective possible routes.

25. The method of any of items 14-24, further comprising:
    determining, using the processing circuit, a first cost function of a second route of the plurality of respective possible routes based on the travel times and the benefit information for the second route;
    determining, using the processing circuit, a second cost function of a third route of the plurality of respective possible routes based on a minimum sum of travel times for traveling from the starting location to the destination location; and
    determining, using the processing circuit, a discount price based on a difference between the first cost function and the second cost function.

26. The method of item 25, wherein the difference between the first cost function and the second cost function is based on a time difference between: a) a first amount of time to travel from the starting location to the destination location using the second route, and b) a second amount of time to travel from the starting location to the destination location using the third route.

27. One or more non-transitory storage media storing instructions which, when executed by one or more computing devices, cause performance of the method recited in any one of items 14-26.

28. A system comprising:
one or more computer processors; and
one or more non-transitory storage media storing instructions which, when executed by the one or more computer processors, cause performance of operations comprising:
obtaining, using a processing circuit, a route between a starting location and a destination location;
obtaining, using the processing circuit, map-age information for the route;
determining, using the processing circuit, a first set of driving parameters for the autonomous vehicle based on the map-age information; and
navigating, using a control circuit, the autonomous vehicle along the route using the first set of driving parameters.

29. The system of item 28, wherein navigating the autonomous vehicle along the route using the first set of driving parameters includes performing a map data collection operation for at least a portion of the route while navigating the autonomous vehicle along the route between the starting location and the destination location.

30. The system of any of items 28-29, wherein the route is comprised of one or more edges.

31. The system of any of items 28-30, wherein the first set of driving parameters includes a set of predetermined maneuvers for operating the autonomous vehicle.

32. The system of item 31, wherein an amount of maneuvers in the set of predetermined maneuvers for operating the autonomous vehicle is proportional to an amount of time elapsed since the map-age information was updated for at least a portion of the route.

33. The system of any of items 31-32, wherein the set of predetermined maneuvers includes one or more of: a permissible frequency of switching lanes, a permissible distance from one or more road boundaries, or a permissible amount of time travelling in a particular lane.

34. The system of any of items 28-33, wherein the first set of driving parameters is different from a second set of driving parameters that is not based on the map-age information.

35. The system of item 34, wherein the first set of driving parameters includes a set of maneuvers for operating the autonomous vehicle to collect map data, and the second set of driving parameters does not include the set of maneuvers for operating the autonomous vehicle to collect map data.

36. The system of any of items 34-35, wherein:
a permissible frequency of switching lanes is greater in the first set of driving parameters than in the second set of driving parameters,
a permissible distance from one or more road boundaries is less in the first set of driving parameters than in the second set of driving parameters, and
a permissible amount of time travelling in a particular lane is greater in the first set of driving parameters than in the second set of driving parameters.

37. The system of any of items 28-36, the operations further comprising:
obtaining, using the processing circuit, route conditions for the route,
wherein determining the first set of driving parameters includes determining the first set of driving parameters for the autonomous vehicle based on the map-age information and the route conditions.

38. The system of item 37, wherein the route conditions provide an indication of whether the route is suitable for a respective set of driving parameters.

39. The system of any of items 37-38, wherein the route conditions include traffic conditions for at least a portion of the route.

40. The system of any of items 37-39, wherein the route conditions include weather conditions for at least a portion of the route.

41. The system of any of items 37-40, wherein the route conditions include an indication of a location of the autonomous vehicle along the route.

42. The system of any of items 37-41, wherein the route conditions include road surface conditions for at least a portion of the route.

43. The system of any of items 28-42, the operations further comprising:
determining, using the processing circuit, a first cost function of the route based on a first travel time for navigating the autonomous vehicle along the route using the first set of driving parameters;
determining, using the processing circuit, a second cost function of the route based on a second travel time for navigating the autonomous vehicle along the route using a third set of driving parameters that are not based on the map-age information; and
determining, using the processing circuit, a discount price based on a difference between the first cost function and the second cost function.

44. The system of item 43, wherein the difference between the first cost function and the second cost function is based on a time difference between the first travel time and the second travel time.

45. A method for determining route planning data for a route of an autonomous vehicle, the method comprising:
obtaining, using a processing circuit, a route between a starting location and a destination location;
obtaining, using the processing circuit, map-age information for the route;
determining, using the processing circuit, a first set of driving parameters for the autonomous vehicle based on the map-age information; and
navigating, using a control circuit, the autonomous vehicle along the route using the first set of driving parameters.

46. The method of item 45, wherein navigating the autonomous vehicle along the route using the first set of driving parameters includes performing a map data collection operation for at least a portion of the route while navigating the autonomous vehicle along the route between the starting location and the destination location.

47. The method of any of items 45-46, wherein the route is comprised of one or more edges.

48. The method of any of items 45-47, wherein the first set of driving parameters includes a set of predetermined maneuvers for operating the autonomous vehicle.

49. The method of item 48, wherein an amount of maneuvers in the set of predetermined maneuvers for operating the autonomous vehicle is proportional to an amount of time elapsed since the map-age information was updated for at least a portion of the route.

50. The method of any of items 48-49, wherein the set of predetermined maneuvers includes one or more of: a permissible frequency of switching lanes, a permissible distance from one or more road boundaries, or a permissible amount of time travelling in a particular lane.

51. The method of any of items 45-50, wherein the first set of driving parameters is different from a second set of driving parameters that is not based on the map-age information.

52. The method of item 51, wherein the first set of driving parameters includes a set of maneuvers for operating the autonomous vehicle to collect map data, and the second set of driving parameters does not include the set of maneuvers for operating the autonomous vehicle to collect map data.

53. The method of any of items 51-52, wherein:
a permissible frequency of switching lanes is greater in the first set of driving parameters than in the second set of driving parameters,
a permissible distance from one or more road boundaries is less in the first set of driving parameters than in the second set of driving parameters, and
a permissible amount of time travelling in a particular lane is greater in the first set of driving parameters than in the second set of driving parameters.

54. The method of any of items 45-53, further comprising:
obtaining, using the processing circuit, route conditions for the route,
wherein determining the first set of driving parameters includes determining the first set of driving parameters for the autonomous vehicle based on the map-age information and the route conditions.

55. The method of item 54, wherein the route conditions provide an indication of whether the route is suitable for a respective set of driving parameters.

56. The method of any of items 54-55, wherein the route conditions include traffic conditions for at least a portion of the route.

57. The method of any of items 54-56, wherein the route conditions include weather conditions for at least a portion of the route.

58. The method of any of items 54-57, wherein the route conditions include an indication of a location of the autonomous vehicle along the route.

59. The method of any of items 54-58, wherein the route conditions include road surface conditions for at least a portion of the route.

60. The method of any of items 45-59, further comprising:
determining, using the processing circuit, a first cost function of the route based on a first travel time for navigating the autonomous vehicle along the route using the first set of driving parameters;
determining, using the processing circuit, a second cost function of the route based on a second travel time for navigating the autonomous vehicle along the route using a third set of driving parameters that are not based on the map-age information; and
determining, using the processing circuit, a discount price based on a difference between the first cost function and the second cost function.

61. The method of item 60, wherein the difference between the first cost function and the second cost function is based on a time difference between the first travel time and the second travel time.

62. One or more non-transitory storage media storing instructions which, when executed by one or more computing devices, cause performance of the method recited in any one of items 45-61.

What is claimed is:

1. A system comprising:
one or more computer processors; and
one or more non-transitory storage media storing instructions which, when executed by the one or more computer processors, cause the one or more computer processors to:
obtain map data including a starting location and a destination location for an autonomous vehicle;
determine, based on the map data, a plurality of travel times for a plurality of possible routes, respectively, for traveling from the starting location to the destination location;
determine a map age factor associated with at least a first possible route from the plurality of possible routes, wherein the map age factor represents an age of at least a portion of the map data associated with at least one segment of the first possible route;
select the first possible route as a driving route based on the plurality of travel times and the map age factor;
modify a set of driving parameters for the autonomous vehicle for the at least one segment of the driving route to facilitate collection of map data within the at least one segment; and
cause the autonomous vehicle to navigate based on the driving route and the modified set of driving parameters,
wherein the driving parameters comprise a threshold acceleration and a threshold amount of time for driving in a particular lane, and wherein the modifying of the set of driving parameters comprises increasing the threshold acceleration and increasing the threshold amount of time for driving in the particular lane.

2. The system of claim 1, wherein the plurality of travel times includes respective travel times associated with respective edges comprising the plurality of possible routes.

3. The system of claim 1, wherein the map age factor is inversely proportional to an amount of time elapsed since the portion of the map data was collected.

4. The system of claim 1, wherein the instructions, when executed by the one or more computer processors, further cause the one or more computer processors to obtain one or more calibration suitability factors.

5. The system of claim 4, wherein the one or more calibration suitability factors are inversely proportional to a determination of how unsuitable the at least one segment of the first possible route is for performing sensor calibration.

6. The system of claim 1, wherein selecting the route based on the plurality of travel times and the map age factor includes selecting, from the plurality of possible routes, the first possible route having a minimum value for a sum of: a) the plurality of travel times for traveling from the starting location to the destination location, and b) weighted map age factors for respective ones of the plurality of possible routes.

7. The system of claim 1, wherein the instructions, when executed by the one or more computer processors, further cause the one or more computer processors to:
determine a first cost function of a second route of the plurality of possible routes based on the plurality of travel times and a map age factor associated with the second route;
determine a second cost function of a third route of the plurality of possible routes based on a minimum sum of travel times for traveling from the starting location to the destination location; and
determine a discount price based on a difference between the first cost function and the second cost function.

8. The system of claim 7, wherein the difference between the first cost function and the second cost function is based on a time difference between: a) a first amount of time to travel from the starting location to the destination location using the second route, and b) a second amount of time to travel from the starting location to the destination location using the third route.

9. A method for determining a route of an autonomous vehicle, the method comprising:
obtaining, using a processing circuit, map data including a starting location and a destination location for an autonomous vehicle;
determining, using the processing circuit, a plurality of travel times for a plurality of possible routes, respectively, for traveling from the starting location to the destination location;
determine, using the processing circuit, a map age factor associated with at least a first possible route from the plurality of possible routes, wherein the map age factor represents an age of at least a portion of the map data associated with at least one segment of the first possible route;
selecting, using the processing circuit, the first possible route as a driving route based on the plurality of travel times and the map age factor;
modifying, using the processing circuit, a set of driving parameters for the autonomous vehicle for the at least one segment of the driving route to facilitate collection of map data within the at least one segment; and
causing the autonomous vehicle to navigate based on the driving route and the modified set of driving parameters,
wherein the driving parameters comprise a threshold acceleration and a threshold amount of time for driving in a particular lane, and wherein the modifying of the set of driving parameters comprises increasing the threshold acceleration and increasing the threshold amount of time for driving in the particular lane.

10. The method of claim 9, wherein the plurality of travel times includes respective travel times associated with respective edges comprising the plurality of possible routes.

11. The method of claim 9, further comprising:
obtaining one or more calibration suitability factors.

12. The method of claim 9, wherein selecting the route based on the plurality of travel times and the map age factor includes selecting, from the plurality of possible routes, the first possible route having a minimum value for a sum of: a) the plurality of travel times for traveling from the starting location to the destination location, and b) weighted map age factors for respective ones of the plurality of possible routes.

13. The method of claim 9, further comprising:
determining, using the processing circuit, a first cost function of a second route of the plurality of possible routes based on the plurality of travel times and the map age factor associated with the second route;
determining, using the processing circuit, a second cost function of a third route of the plurality of possible routes based on a minimum sum of travel times for traveling from the starting location to the destination location; and
determining, using the processing circuit, a discount price based on a difference between the first cost function and the second cost function.

14. The method of claim 13, wherein the difference between the first cost function and the second cost function is based on a time difference between: a) a first amount of time to travel from the starting location to the destination location using the second route, and b) a second amount of time to travel from the starting location to the destination location using the third route.

15. A non-transitory computer-readable storage medium storing instructions configured to be executed by one or more circuits of an autonomous vehicle that cause the autonomous vehicle to carry out steps that include:
obtaining, using a processing circuit, map data including a starting location and a destination location for an autonomous vehicle;
determining, using the processing circuit, a plurality of travel times for a plurality of possible routes, respectively, for traveling from the starting location to the destination location;
determining, using the processing circuit, a map age factor associated with at least a first possible route from the plurality of possible routes, wherein the map age factor represents an age of at least a portion of the map data associated with at least one segment of the first possible route;
selecting, using the processing circuit, the first possible route as a driving route based on the plurality of travel times and the map age factor;
modifying, using the processing circuit, a set of driving parameters for the autonomous vehicle for the at least one segment of the driving route to facilitate collection of map data within the at least one segment; and
causing the autonomous vehicle to navigate based on the driving route,
wherein the driving parameters comprise a threshold acceleration and a threshold amount of time for driving in a particular lane, and wherein the modifying of the set of driving parameters comprises increasing the threshold acceleration and increasing the threshold amount of time for driving in the particular lane.

16. The system of claim 1, wherein the map age factor comprises a cost based on the age of the map data associated with the at least one segment.

17. The system of claim 16, wherein the cost of the map age factor is inversely proportional to the age of the map data associated with the at least one segment.

18. The system of claim 17, wherein selecting the route based on the plurality of travel times and the map age factor comprises includes selecting a possible route having a minimum sum of costs.

19. The system of claim 1, wherein the driving parameters comprise a distance tolerance between the autonomous vehicle and at least one object within the environment and wherein the modifying of the set of driving parameters comprises reducing the distance tolerance between the autonomous vehicle and the at least one object within the environment.

20. The system of claim 1, wherein the driving parameters comprise a threshold frequency for switching lanes and a threshold deceleration, and wherein the modifying of the set of driving parameters comprises increasing the threshold frequency for switching lanes and increasing the threshold deceleration.

* * * * *